(12) United States Patent
Yap et al.

(10) Patent No.: US 8,312,490 B2
(45) Date of Patent: Nov. 13, 2012

(54) DVR WITH ENHANCED FUNCTIONALITY

(75) Inventors: Adrian Yap, Gaithersburg, MD (US);
Michael Ficco, Silver Spring, MD (US);
Robert Davis, Woodbine, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 1127 days.

(21) Appl. No.: 09/837,844

(22) Filed: Apr. 18, 2001

(65) Prior Publication Data

US 2001/0033736 A1 Oct. 25, 2001

Related U.S. Application Data

(63) Continuation-in-part of application No. 09/766,252, filed on Jan. 19, 2001, now abandoned, which is a continuation-in-part of application No. 09/533,843, filed on Mar. 23, 2000, now abandoned.

(60) Provisional application No. 60/199,438, filed on Apr. 25, 2000.

(51) Int. Cl.
*H04N 5/76* (2006.01)
*G06F 3/00* (2006.01)
*G06F 13/00* (2006.01)
*H04N 5/445* (2011.01)

(52) U.S. Cl. ........... 725/58; 386/298; 386/296; 386/297

(58) Field of Classification Search .................... 725/58, 725/142; 386/40, 92, 83, 68, 124
See application file for complete search history.

(56) References Cited

U.S. PATENT DOCUMENTS 4,706,121 A   11/1987 Young
5,283,791 A * 2/1994 Halford .......................... 714/766
(Continued)

FOREIGN PATENT DOCUMENTS

EP   0840512   5/1998
(Continued)

OTHER PUBLICATIONS

Moseley et al. "Mastering Microsoft Office 97 Professional Edition", Published by Sybex in 1997, p. 238.*

(Continued)

*Primary Examiner* — Pankaj Kumar
*Assistant Examiner* — Usha Raman

(57) ABSTRACT

A personal video on-demand system and method which permits a user to receive available content using a single tuner and perform one of a plurality of operations on the available content. These operations include recording two or more signals, where one or both may be simultaneously viewed, recording one or more signals and playing back one or more signals, playing back two or more signals, watching one or more signals while recording one or more other signals, viewing two or more signals live, or viewing at least one signal live, while viewing one or more signals in a playback mode. These operations also include selecting an even based on actor, actress, director, etc., alerting a user to an attempt to record a duplicate program, displaying a status of a program from the available content the user is watching, playing paused programming or converting paused programming to recorded programming during a channel change, allowing a user to record an entire program after viewing the program for a period of time, permitting a user to capture a snippet of the available content, permitting a user to rewind recording in an increment for playback of a portion of the available content, enabling a user to jump back from a live broadcast to a last paused video segment.

15 Claims, 10 Drawing Sheets

U.S. PATENT DOCUMENTS

| | | | |
|---|---|---|---|
| 5,532,754 | A | 7/1996 | Young et al. |
| 5,699,107 | A | 12/1997 | Lawler et al. |
| 5,701,383 | A | 12/1997 | Russo et al. |
| 5,761,607 | A * | 6/1998 | Gudesen .................... 725/89 |
| 5,828,416 | A | 10/1998 | Ryan |
| 5,880,768 | A | 3/1999 | Lemmons et al. |
| 5,901,246 | A * | 5/1999 | Hoffberg et al. ............ 382/209 |
| 5,928,327 | A | 7/1999 | Wang et al. |
| 5,995,155 | A * | 11/1999 | Schindler et al. ............ 348/461 |
| 6,005,561 | A | 12/1999 | Hawkins et al. |
| 6,018,359 | A | 1/2000 | Kermode et al. |
| 6,034,738 | A | 3/2000 | Sparks |
| 6,137,539 | A | 10/2000 | Lownes et al. |
| 6,169,842 | B1 | 1/2001 | Pijnenburg et al. |
| 6,170,009 | B1 | 1/2001 | Mandal et al. |
| 6,209,025 | B1 | 3/2001 | Bellamy |
| 6,233,389 | B1 | 5/2001 | Barton et al. |
| 6,236,395 | B1 | 5/2001 | Sezan et al. |
| 6,304,714 | B1 | 10/2001 | Krause et al. |
| 6,311,011 | B1 | 10/2001 | Kuroda |
| 6,349,410 | B1 | 2/2002 | Lortz |
| 6,363,440 | B1 | 3/2002 | Stepp et al. |
| 6,392,664 | B1 | 5/2002 | White et al. |
| 6,434,621 | B1 | 8/2002 | Pezzillo et al. |
| 6,469,753 | B1 | 10/2002 | Klosterman et al. |
| 6,502,242 | B1 | 12/2002 | Howe et al. |
| 6,577,811 | B1 | 6/2003 | Kikuchi et al. |
| 6,584,272 | B1 | 6/2003 | Fukushima et al. |
| 6,601,074 | B1 * | 7/2003 | Liebenow .................. 707/104.1 |
| 6,642,939 | B1 | 11/2003 | Vallone et al. |
| 6,674,448 | B1 | 1/2004 | Garahi et al. |
| 6,675,385 | B1 | 1/2004 | Wang |
| 6,678,463 | B1 * | 1/2004 | Pierre et al. .................... 386/83 |
| 6,678,757 | B1 | 1/2004 | Paulus et al. |
| 6,714,722 | B1 | 3/2004 | Tsukidate |
| 6,728,753 | B1 | 4/2004 | Parasnis et al. |
| 6,745,252 | B1 | 6/2004 | Yanagawa et al. |
| 6,751,398 | B2 * | 6/2004 | Agnihotri et al. ............... 386/46 |
| 6,751,401 | B1 * | 6/2004 | Arai et al. ....................... 386/83 |
| 6,756,997 | B1 | 6/2004 | Ward, III et al. |
| 6,760,535 | B1 * | 7/2004 | Orr ................................ 386/46 |
| 6,822,661 | B2 | 11/2004 | Sai et al. |
| 6,829,428 | B1 * | 12/2004 | Quintos .......................... 386/69 |
| 6,847,778 | B1 * | 1/2005 | Vallone et al. .................. 386/68 |
| 6,854,127 | B1 * | 2/2005 | Kanemitsu ..................... 725/58 |
| 7,093,273 | B2 | 8/2006 | Marsh |
| 7,272,298 | B1 * | 9/2007 | Lang et al. .................... 386/291 |
| 7,640,320 | B2 | 12/2009 | Madison et al. |
| 2002/0054752 | A1 * | 5/2002 | Wood et al. .................... 386/83 |
| 2002/0056102 | A1 | 5/2002 | Dillon et al. |
| 2002/0057893 | A1 * | 5/2002 | Wood et al. .................... 386/46 |
| 2002/0120925 | A1 | 8/2002 | Logan |
| 2002/0124099 | A1 * | 9/2002 | Srinivasan et al. ............ 709/231 |
| 2002/0174430 | A1 * | 11/2002 | Ellis et al. ....................... 725/46 |
| 2003/0046401 | A1 | 3/2003 | Abbott et al. |
| 2003/0149988 | A1 | 8/2003 | Ellis et al. |
| 2003/0159147 | A1 | 8/2003 | Young et al. |
| 2004/0019903 | A1 | 1/2004 | Knudson et al. |
| 2004/0128685 | A1 * | 7/2004 | Hassell et al. .................. 725/40 |
| 2004/0213545 | A1 | 10/2004 | Park et al. |
| 2004/0261108 | A1 | 12/2004 | Yuen et al. |
| 2005/0028208 | A1 | 2/2005 | Ellis et al. |
| 2005/0060446 | A1 * | 3/2005 | Parry et al. .................... 710/53 |
| 2005/0144641 | A1 | 6/2005 | Lewis |
| 2005/0198677 | A1 * | 9/2005 | Lewis ............................ 725/87 |
| 2005/0204388 | A1 * | 9/2005 | Knudson et al. ............... 725/58 |
| 2005/0204400 | A1 * | 9/2005 | Ranta et al. ................... 725/136 |
| 2005/0235323 | A1 | 10/2005 | Ellis et al. |
| 2005/0273819 | A1 | 12/2005 | Knudson et al. |
| 2007/0067800 | A1 * | 3/2007 | Wachtfogel et al. ............ 725/42 |
| 2011/0093898 | A1 | 4/2011 | Rosenthol et al. |

FOREIGN PATENT DOCUMENTS

| | | |
|---|---|---|
| EP | 0930781 | 7/1999 |
| WO | WO 92/22983 * | 12/1992 |
| WO | WO 9851076 A1 * | 11/1998 |
| WO | WO00/02386 | 1/2000 |
| WO | WO 00/07368 | 2/2000 |
| WO | WO 00/10327 | 2/2000 |
| WO | WO 00/16548 | 3/2000 |

OTHER PUBLICATIONS

Droitcourt, J.L.; "Integra Architecture—Anatomy of the Interactive Television Set-Top Box, How It Works and What It Means to the Consumer"; International Broadcasting Convention; Sep. 12-16, 1996.

TIVO manual for HDR110.

Non-final Office Action dated Sep. 26, 2008 in U.S. Appl. No. 11/699,675, filed Jan. 30, 2007 by Adrian Yap et al.

Final Rejection dated Mar. 13, 2009 in U.S. Appl. No. 11/699,675, filed Jan. 30, 2007 by Adrian Yap et al.

Non-final Office Action dated Jul. 23, 2009 in U.S. Appl. No. 11/699,675, filed Jan. 30, 2007 by Adrian Yap et al.

Final Rejection dated Feb. 2, 2010 in U.S. Appl. No. 11/699,675, filed Jan. 30, 2007 by Adrian Yap et al.

Non-final Office action dated Feb. 2, 2011 in U.S. Appl. No. 11/699,675, filed Jan. 30, 2007 by Adrian Yap et al.

Final Rejection dated Aug. 19, 2011 in U.S. Appl. No. 11/699,675, filed Jan. 30, 2007 by Adrian Yap et al.

Non-final Office action dated Jun. 6, 2012 in U.S. Appl. No. 11/699,675, filed Jan. 30, 2007 by Adrian Yap et al.

Final Rejection dated Sep. 21, 2012 in U.S. Appl. No. 11/699,675 filed Jan. 30, 2007 by Adrian Yap et al.

* cited by examiner

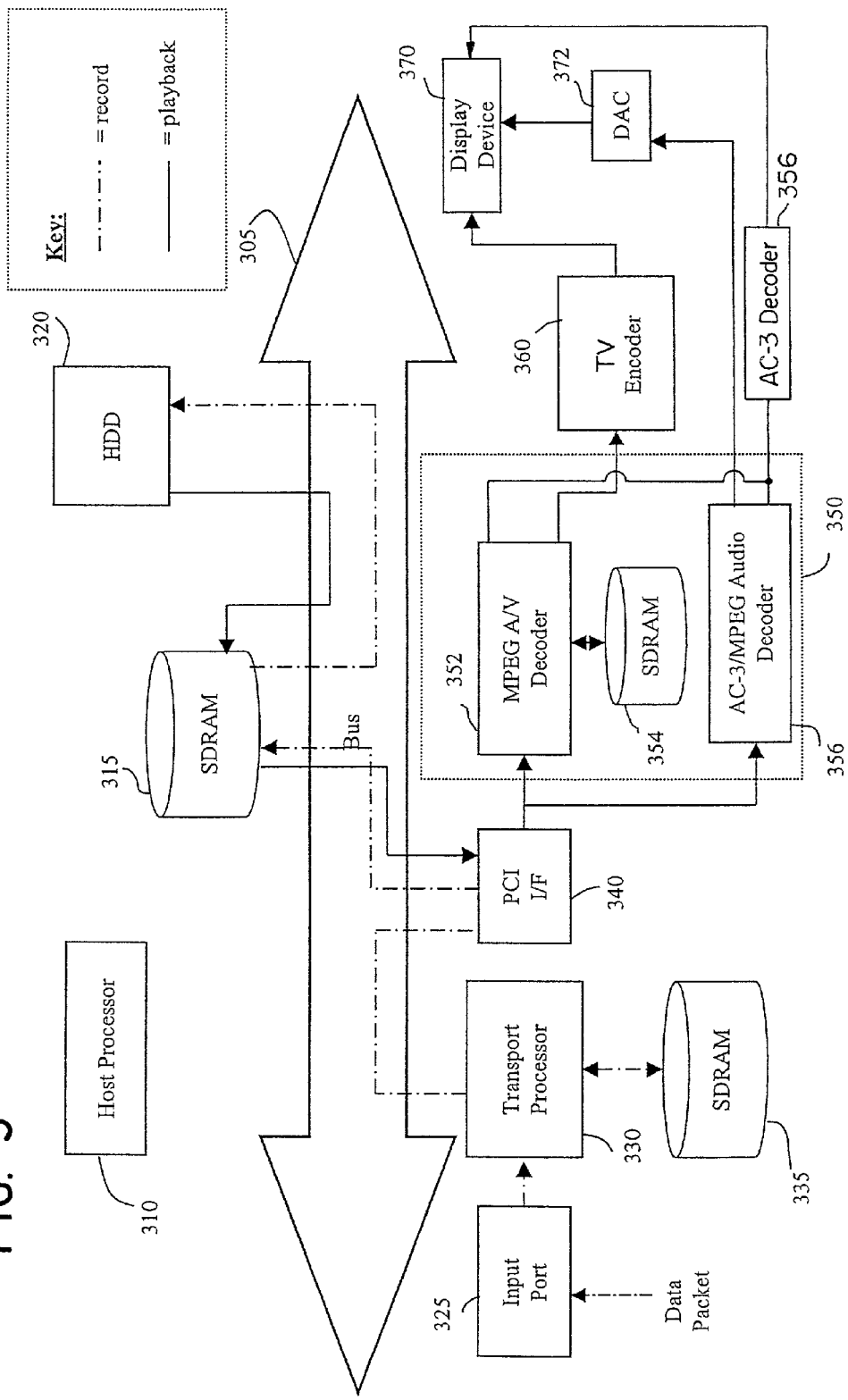

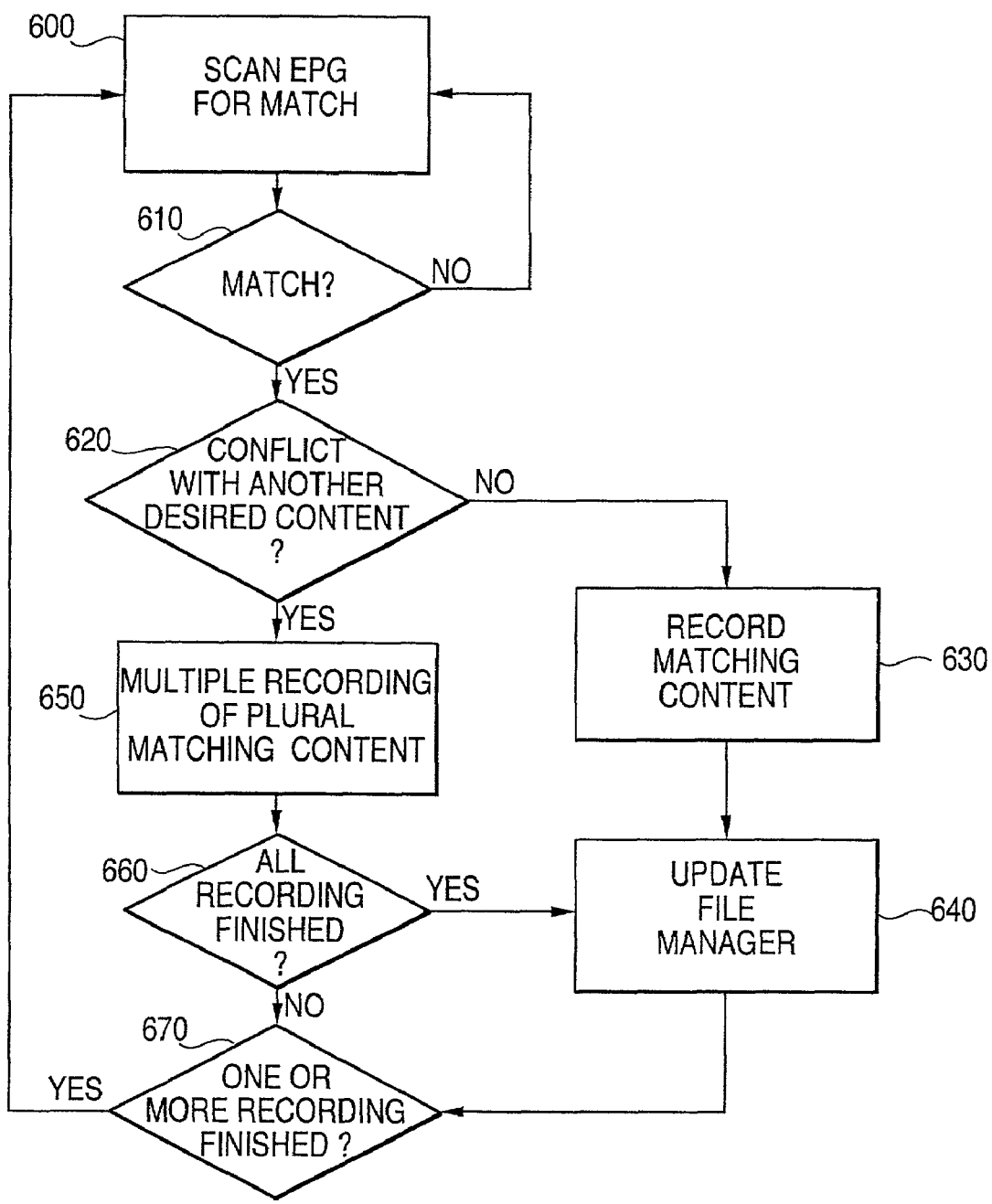

DVR WITH ENHANCED FUNCTIONALITY

CROSS REFERENCE TO RELATED APPLICATIONS

This application is a continuation-in-part and claims benefit under 35 U.S.C. §120 of U.S. Non-Provisional application of Doug Dillon, et al entitled "Personal Video On-Demand System and Method", Ser. No. 09/766,252 filed on, Jan. 19, 2001 now abandoned, which is a continuation-in-Part and claims benefit under 35 U.S.C. §120 of U.S. Non-Provisional application of Michael Ficco et al entitled "Personal Video On-Demand System and Method", Ser. No. 09/533,843 filed on Mar. 23, 2000 now abandoned, the entire contents of both are incorporated by reference herein. This application also claims benefit under 35 U.S.C. §119(e) of U.S. Provisional application of Adrian Yap, et al entitled "Digital Video Recorder", Ser. No.: 60/199,438 filed on Apr. 25, 2000, the entire contents of which is incorporated by reference herein.

BACKGROUND OF THE INVENTION

1. Field of the Invention

The present invention generally relates to audio and video devices. The present invention more specifically relates to the field of video-on-demand equipment and services.

2. Background of the Prior Art

Providing video-on-demand has been a elusive goal sought after by a variety of companies. Many of the efforts to date have been stymied by the enormous bandwidth consumed when a large number of movies or other content are requested by individuals. This problem is exacerbated when an insufficient number of consumers request a particular movie such that it is not economically justified to consume the available bandwidth for such a small number of requests. In order to be profitable, conventional video-on-demand services offer only the most popular movies. The result is that the most attractive feature of video-on-demand is destroyed. This most attractive feature is the availability of a wide variety of movies or other content on demand of a consumer.

Various other problems exist in conventional video-on-demand services including inconvenient and limited ways in which to designate desired content.

Another shortcoming of conventional video-on-demand services is the inability to aggregate a video library in a fast and efficient manner. Another shortcoming of conventional video-on-demand services is the negative impact of aggregating a video library on the normal viewing habits of the consumer.

Another shortcoming of conventional video-on-demand services is a limitation on the number of signals which may be recorded, viewed, and/or played back at any time. Other problems include the inability to manipulate the recorded, viewed and/or played back signal(s) in a manner desired by the user.

SUMMARY OF THE INVENTION

An object of the present invention is to remedy the above-noted deficiencies in conventional video-on-demand services and equipment. Another object is to enable video-on-demand equipment with a capacity large enough to accommodate potentially desired content. Yet another object of the invention is to provide an expandable storage device that can be easily added to by a consumer thereby increasing the capacity for the personal video library. Another object of the invention is to provide simultaneous recording, play back, and viewing of multiple signals. Yet another object is to provide a set of functions to enable the user to manipulate the signals input thereto.

One aspect of achieving the above object is to utilize an array of hard disk drives to create a video server farm. Such a video server farm provides the enormous capacity necessary for an adequate content library while also providing an expandable storage space.

The invention creates a new paradigm for video-on-demand services in which a video server farm is utilized in combination with an electronic program guide and associated receiver, tuner, control unit, and user interface that enables a consumer to create his own, personal video-on-demand library.

More specifically, the present invention includes a content feed that provides a variety of content or broadcast television programs from numerous transmission media to, for example, a set-top box or other apparatus. The invention includes a receiver/tuner that receives the content stream from the content feed and routes the content stream to a display unit, a decoder/decrypter or to a storage device in response to a control signal from a control unit. In this way, the content stream may be directly viewed as in a conventional cable box or decoded/decrypted before being viewed by a display unit. Another route provided by the invention is to a storage device so that selected content may be recorded.

To aid in the selection of desired content, an electronic program guide is utilized. This electronic program guide receives programming information for available content that will be broadcast to the inventive apparatus in the future. With a user interface device, the user can interact with the electronic program guide and select the desired programs that will be recorded on the storage device. Enhanced functionality for the electronic program guide includes the ability to track previously selected content so that identical or similar programs can be recorded in the future. Other enhancements include inputting selection criteria such as actor, director, theme, keywords, channel information, station call letters, etc. which can be utilized by the control unit to search the electronic program guide for content matching the consumer's criteria.

Preferably, the storage device is expandable and/or removable such that the user can easily add and/or remove additional storage capacity as desired or needed. For example, the storage device may include magnetic tape, magnetic or optical disk (for example, a read/write disk or a write once/read many disk), CD, DVD, of a portable digital audio/video/data player.

Further enhancements to the present invention include the ability to transcode from one medium type to another to ensure efficient storage, regardless of the target medium. Transcoding may include using different compression techniques or different sets of compression parameters for the same compression technique.

Further enhancements to the present invention include a file manager for the creation and management of a database, which includes an entry for each program recorded. The file manager further supports other database manipulation operations, such as adding, deleting, searching, etc. The file manager also enables the user to print a physical label that may be attached to storage media. The file manager also permits annotation of the database entry for each program recorded. The information contained in these annotations may be supplied electronically, such as via an electronic program guide or may be manually generated by a user.

Further enhancements to the present invention include the use of internal and external memory in combination. This enables the present invention to record program information to internal memory and then to external memory or to stream program information directly to external memory. The combination of internal and external also permits recording from removable memory into internal memory and then ultimate playback from the internal memory.

Further enhancements to the present invention include a multiple receiver/tuner embodiment in which multiple content streams can be received, tuned and provided to the storage device. With a plurality of receiver/tuners, this modification has the ability to simultaneously record a plurality of programs on a storage device. A multiple display unit such as a picture-in-picture television can be utilized to simultaneously view the two programs being recorded. Alternatively, one program can be recorded while another is being viewed either from a live broadcast or from the previously recorded video library in the storage unit.

Further enhancements to the present invention include several modes, including, but not limited to recording two or more signals where one or both may also be simultaneously viewed, recording one or more signals and playing back one or more signals, playing back two or more signals, watching one or more signals, while recording one or more other signals, viewing two or more live signals (through the use of picture-in-picture or other similar function), and viewing at least one signal live, while viewing one or more signals in playback mode.

Further enhancements to the present invention include various functions, which enable the user to manipulate the recorded, viewed, and/or played back signals in a manner desired by the user. These functions include but are not limited to an intelligent agent function, by which the user may select at least one recorded event from a program guide or schedule, based on actors, actresses, directors, or other relevant information, a duplicate episode filter function, which alerts a user if a duplicate episode is being recorded, a status indicator function, which displays the status of the program the user is watching, a clear convert function, which offers the user the opportunity to clear paused (live cached) programming or convert paused programming to recorded programming during a channel change, a record after watching feature which allows a user to record an entire program after viewing the program for a period of time, an active snapshot feature, which permits the user to capture snippets of digital audio/video broadcasts, a personal instant replay feature, which permits a user to rewind recording in fixed increments for playback, and a back to pause feature, which enables the user to jump back from a live broadcast to the last paused video segment.

It is noted that the various functions described above may be utilized in conjunction with one or more of the modes. For example, the intelligent agent duplicate filter, and active snapshot functions may be used with any recording mode, the status indicator and personal instant replay features may be utilized with any playback mode, and the status indicator, clear convert, record after watching, and personal instant replay functions may be utilized in any live viewing mode. The back to pause function may be utilized to jump between any two or more live or playback signals.

The invention also includes a method of determining potentially desired content which includes manually inputting content selection(s) and selection criteria. As mentioned above, the selection criteria may include a variety of criteria such as actor, program name, director, keywords, channel information, station call letters, etc. Such selection criteria may be utilized in conjunction with tagged content in which the content stream is tagged with additional information associated with the content. For example, a typical tag may include which actors star in the program, the director, a synopsis, keywords, a thumbnail, a preview, a snippet, etc. The tags may be in-band or otherwise transmitted along with the content or associated with the program and sent separately such as with an electronic program guide. In any of these alternatives, the selection criteria may be utilized to search through these tags for potentially desired content.

Furthermore, the methods of the invention track previously selected content and previously utilized selection criteria in order to learn the consumers preferences. This tracked information is then added to the selection of potentially desired content so that the appropriate content may be recorded by the inventive apparatus.

The method of operating the inventive apparatus may also include downloading the electronic program guide on a periodic basis. Selections and criteria may then be inputted. The electronic program guide is then scanned for content matching the selections and/or input criteria. If a match is found, then a broadcast channel is tuned and the content output to the storage device. Appropriate changes are made to a file manager to keep track of the recorded content. Thereafter, the consumer can manage the recorded content by, for example, deleting, sorting, cataloging, commenting, etc.

On the content provider side, the electronic program guide may be compiled and uploaded to the user. Because different regions of the country have different available channels, the program listings may be winnowed to only those available to the particular consumer. Tags can then be generated that describe or otherwise indicate the program content and these tags are associated with the program listings.

The inventive methods also include simultaneous recording of multiple content streams. After scanning the electronic program for content matching the consumer's preferences, the invention determines whether there are scheduling conflicts. Such scheduling conflicts are resolved by multiple, simultaneous recording of plural content streams.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 9 illustrates an alternative recording path in accordance with the present invention;

FIG. 10 is a high-level flow chart of a method of creating a personalized video-on-demand service capable of simultaneous, multiple recording of plural content streams.

DETAILED DESCRIPTION OF PREFERRED EMBODIMENTS

Figure 1:
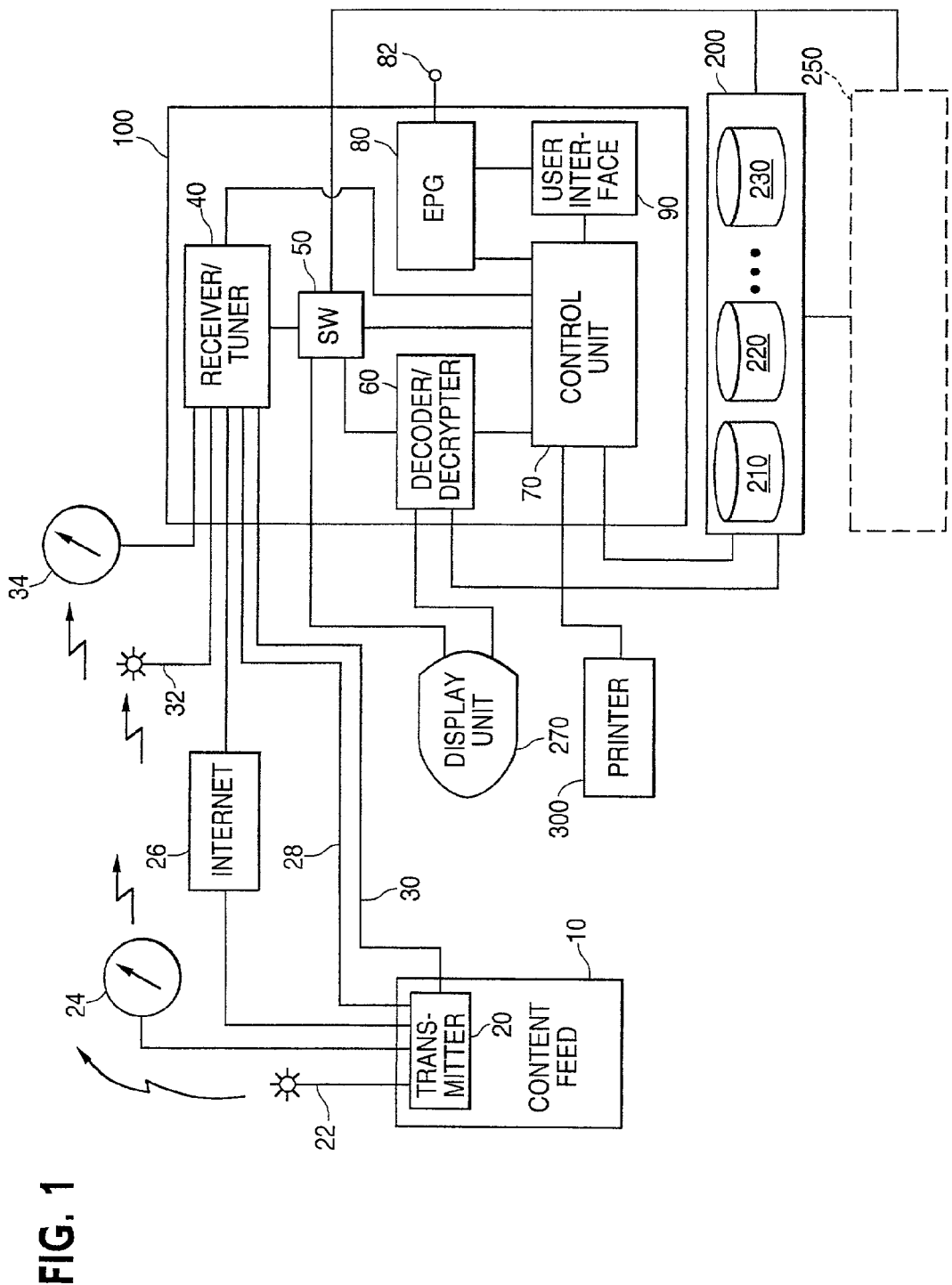
FIG. 1 is a block diagram of a personalized video-on-demand system according to a first aspect of the invention.

As shown in FIG. 1, the personalized video-on-demand system includes a content feed 10. This content feed 10 may include a broadcast television network or internet content provider. The content feed is compatible with all cable, satellite and terrestrial broadcast television systems as indicated by transmitter 20 that is connected to a broadcast antenna 22, satellite up-link 24, internet connection 26, cable 28, and phone line 30. These various connections and standards are exemplary only and are intended to include any system for feeding content to a consumer.

On the consumer side, an apparatus 100 such as a set-top box, hardware card, specially programmed computer or other device having the functionality described herein is provided that may be placed near to or within a television or other display device (such as a computer monitor) such as display unit 270. The apparatus 100 inputs content from devices such as satellite down-link 34, antenna 32, internet connection 26, cable 28, and/or phone line 30. It is to be understood that the apparatus 100 may include just a single communication path including 26, 28, 30, 32, or 34.

The received content is fed to receiver/tuner 40. The receiver/tuner 40 provides an appropriate connection to the corresponding communication path. The receiver/tuner 40 may also select or tune a channel within the spectrum of content being fed to the apparatus 100. If there is only one channel, then the receiver unit 40 need not include a tuner circuit.

A switch 50 is connected to the receiver/tuner 40 and routes the content to display unit 270, decoder/decrypter 60, or storage device 200. The switch 50 is controlled by control unit 70 to route the content to the desired destination. It is noted that all possible permutations from switch 50 can be achieved simultaneously. For example, switch 50 may decode, decrypt, output to display unit 270, and/or record to a storage device and is not limited to performing only a single function at a given time.

The decoder/decrypter 60 includes decoder circuitry and/or decryption circuitry. For example, many video broadcasts are encoded and the decoder 60 decodes this encoded content stream so that it may be viewed by the consumer on display unit 270. Conventional decoding processes such as MPEG1 and MPEG2 are examples of such decoding processes.

The component 60 may also include decryption circuitry that decrypts an encrypted content from the content feed. Some broadcasts, particularly pay-per-view broadcasts or premium channels such as HBO® and Showtime® are encrypted so that non-subscribers cannot view the content. The decrypter 60 decrypts any such encrypted content for viewing on the display unit 270 by the consumer. The decrypter may include a variety of decryption schemes for corresponding premium channels or services. As with conventional cable boxes, the decryption circuitry may be enabled or disabled depending upon the consumer's subscription to the premium channel or associated encrypted content. Authorization for decryption may be governed by appropriate payment for the associated content. For example, pay-per-view content is typically encrypted with decryption authorization governed by an appropriate payment by the consumer.

As a further alternative, the decrypted content may be stored for later purchase and playback. In this alternative, the consumer need not pay in advance or contemporaneous with the live broadcast and can, instead, store the encrypted content for later playback. Such delayed playback may also include an associated payment if required by the content provider by utilizing the user interface 90 and communication channel(s) with content feed 10 or by having the consumer contact the content provider using other communication channels and payment mechanisms.

The component 60 may also implement an encryption scheme separate from and/or in addition to the encryption scheme utilized by the content feed 10. In other words, encrypted content supplied from content feed may be further encrypted to further protect unauthorized access to the content.

The electronic program guide (EPG) 80 is connected to an input port 82 so that updates to the electronic program guide may be downloaded. In other words, the electronic program guide stores available content for the near future. This available content may be updated on a periodic basis so that the consumer can make appropriate selection for upcoming programs. The electronic program guide 80 preferably displays information on the display unit 270. For example, the electronic program guide 80 may display programs in a tabular format by channel and time so that the user can make selections of desired content. Other examples and functionality of the electronic program guide 80 are described below.

The user interface 90 may include various control devices such as a keypad connected directly to the apparatus 100 or a remote control device. The user interface 90 permits the user to interact with the apparatus 100 and electronic program guide 80 and thereby select content for recording and on-demand playback.

The storage device 200 is connected to the switch 50 as well as the control unit 70 and the decoder/decrypter 60. The storage device 200 may also be directly connected to the display unit 270. The storage device 200 may include a plurality of hard disk drives 210, 220, 230 as shown in FIG. 1. Also, the storage device 200 may include only one hard disk drive although the storage capacity would be necessarily limited by the capacity of the single hard disk drive 210.

Preferably, the storage device may be expanded by plugging in additional hard disk drives such as hard disk drive 220 as well as hard disk drive 230. Preferably, adding storage capacity could be easily accomplished by the user by simply plugging in a storage device such as a hard disc drive. The collection of hard disk drives 210, 220 . . . 230 may also be considered a hard disk drive array. Such an array may use conventional data loss prevention methods such as error correcting codes, and Redundant Array of Independent Discs (RAID) methodologies.

The storage device 200 may be further expanded by adding an optional array of hard disk drives 250 as shown by the dotted lines in FIG. 1. The storage devices 200, 250 may be provided in a separate unit from apparatus 100.

Alternatively, the storage device 200 may include other types of storage devices. For example, the storage device may include solid state memory devices such as chips, cards, or sticks. The storage device may also include magnetic tape, magnetic or optical disk (for example, a read/write disk or a write once/read many disk), CD, DVD, a portable digital audio/video/data player, a jukebox, or any other known or not yet invented form of storage.

The storage device further may be reconfigurable, including, as examples, expandable, addable, removable, and/or replaceable. The storage device may be manually reconfigurable or automatically reconfigurable. For example, a user may replace all or part of the storage device. Alternatively, the storage device may be configured as a "juke-box" including a plurality of memory devices 210, 220, 230 (either of the same or different types), which are automatically loaded for recording or playback, possibly based on a user initiated request. The memory devices 210, 200, 230 may be integrated with the storage device 200 and/or the apparatus 100 or accessible via a network (either local or wide-area) utilizing a transfer protocol (for example, the 1394 protocol) or a combination of integrated and removable memory. Preferably, the memory devices 210, 220, 230 may be plugged in or otherwise expanded with a modular design. This modular design is indicated in FIG. 1 by the plurality of storage devices 210, 220, 230 as well as the additional array of storage devices 250. Such a modular design permits a user to easily increase the storage capacity and thereby the size of the video-on-demand library.

The control unit is connected to the storage devices 200, 250, the decoder/decrypter 60, the switch 50, the receiving device 40, the electronic program guide 80, as well as the user interface 90.

In general, the control unit 70 coordinates all of the operations performed by the apparatus 100 by sending appropriate control signals to each of the various components. For example, when the electronic program guide indicates that the desired content will appear on channel 7 at 8:00 pm, the control unit 70 sends a control signal to receiver/tuner 40 to tune channel 7 at 8:00 pm, then control unit 70 sends a control signal to control switch 50 to switch the tuned content and output the tuned content to the storage device 200. The control unit 70 also controls the recording of this content on the storage device 200. For example, the control unit 70 may synchronize the sending/receiving of data between the storage device 200 and the control unit 70, in order to avoid periods of inaccessibility. For example, if one of the memory devices 210, 220, 230 is being removed or otherwise not available, the control unit 70 controls via synchronization, recording and/or playback, such that during the period of inaccessibility, the memory device 210, 220, 230 is not accessed. The control unit 70 may accomplish synchronization by sending a sync pulse to a storage device 200 and/or memory devices 210, 220, 230, in order to coordinate the availability of the memory devices 210, 220, and 230, with the operation desired by the control unit 70. Any necessary decoding or decryption is controlled by control unit 70 which sends commands to the decoder/decrypter the output of which is sent to display unit 270. The control unit 70 may also be utilized to control the rate at which information is recorded or played back. For example, the control unit 70 may record on a first medium, for example an internal medium, in real time, and then stream the information to a removable medium, either faster or slower than real time, depending on the capabilities of the removable medium. Similarly, the control unit 70 may permit the playback of information from either an internal or external memory, either faster or slower than real time, and subsequently output the data for playback in real time. The control unit 70 may utilize one or more medium to vary the rate at which content is either played back or recorded by utilizing at least one medium as a buffer.

The control unit 70 also coordinates the operations between the user interface 90 and the electronic program guide 80. For example, the on-demand playback of previously recorded content may be controlled with the user interface 90 by having the consumer input a command. This command is input by the control unit 70. For example, a play previously-recorded content command may be input by user interface 90. This command is sent to control unit 70 which activates the storage device 200 to read the corresponding content from the storage device 200. Any necessary decoding is then performed by decoder 60 under the control of control unit 70 the results of which are output to display unit 270.

Although the system operates generally as described above, further details of the operation including both the provider and consumer side of the system are described below in relation to the flow charts of FIGS. 3-5. The block diagram of FIG. 6 further describes the operation of the system shown in FIG. 2.

Figure 3:
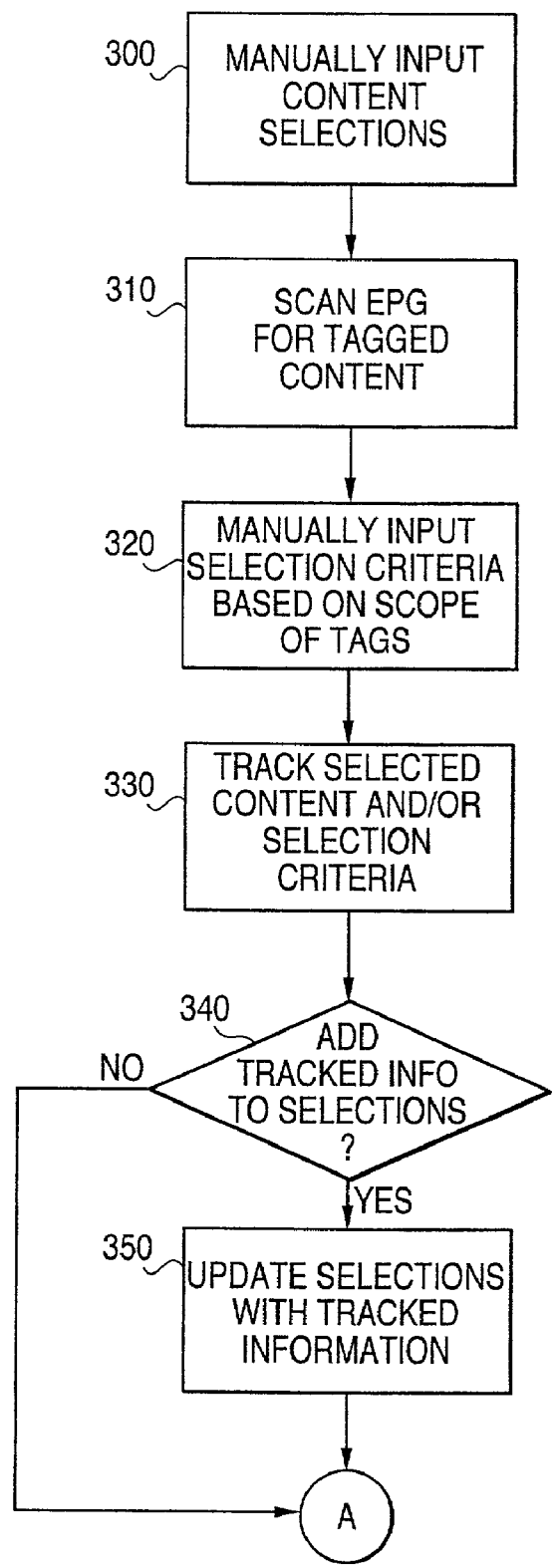
FIG. 3 is a high-level flow chart of the inventive method of determining potentially desired content.

FIG. 3 illustrates a particular example of how the FIG. 1 personal video-on-demand system operates. Specifically, FIG. 3 provides details on how the electronic program guide 80 interacts with the system.

As shown in FIG. 3, the consumer can manually input content selections in step 300. This may be done with the user interface 90. To aid in this process, the electronic program guide 80 may send a display to display unit 270 that aids in the manual input of content selections. In this way, the consumer can designate or otherwise select certain programs or other content to be recorded in the video-on-demand library. Step 300 may also delete previously selected content. In this way, the list of content selections may be tailored to the user's preferences.

Enhancing the electronic program guide 80 are tags. A tag includes data that is associated with or otherwise describes content. For example, a tag may indicate which actors are in a particular movie, the director of the movie, a synopsis of the movie, when it was released, critical reviews of the movie, related programs, sequels, keywords, a thumbnail, a preview, a snippet, or other information concerning or relating to the content. The tags may be in-band or otherwise transmitted along with the content. Alternatively, the tags may be associated with the program or otherwise sent separately such as with an electronic program guide.

Step 310 scans the electronic program guide 80 for content that has been tagged. In other words, step 310 searches or scans through the electronic program guide 80 for any content that has an associated tag. Step 320 allows the user to manually input selection criteria. These selection criteria are preferably based on the scope of the tags. In other words, if the tags are limited to actors and actresses, then the selection criteria may be similarly limited since other criteria would not effect the content selection. In this way, the user can manually input one or more selection criteria in order to search for desired content. This search may return a list or group of programs all of which may be recorded or which may be provided to the user for selection where only the selected content is recorded. This selection may be done by repeating step 300.

To further enhance the electronic program guide, step 330 tracks selected content and/or selection criteria. In other words, previously selected content may be tracked or otherwise stored by the control unit by the storage device 200. Also, previously input selection criteria may also be tracked or otherwise stored by the control unit 70 in the storage device 200. By tracking selected content and/or selection criteria, the electronic program guide 80 may learn the user's preferences and thereby speed the content selection process.

However, the consumer may not desire this tracking to be utilized. Thus, step 340 decides whether the consumer wants to add the tracked information to the selection. This may be done, for example, by prompting the user and inputting a command via the user interface 90. As another option, a default option may be utilized to make the decision of step 340.

If the tracked information is to be added to the selections, then step 350 is performed which updates the selections with the tracked information. In this way, a variety of content selections appropriate to and personalized to the consumer can be generated. The selection may be further managed by rearranging, deleting or by adding further selection by repeating the process shown in FIG. 3. The selection(s) may be presented to the user for modification(s). Alternatively, the system may simply retrieve the selections without user modification(s) to the selection(s).

Figure 4:
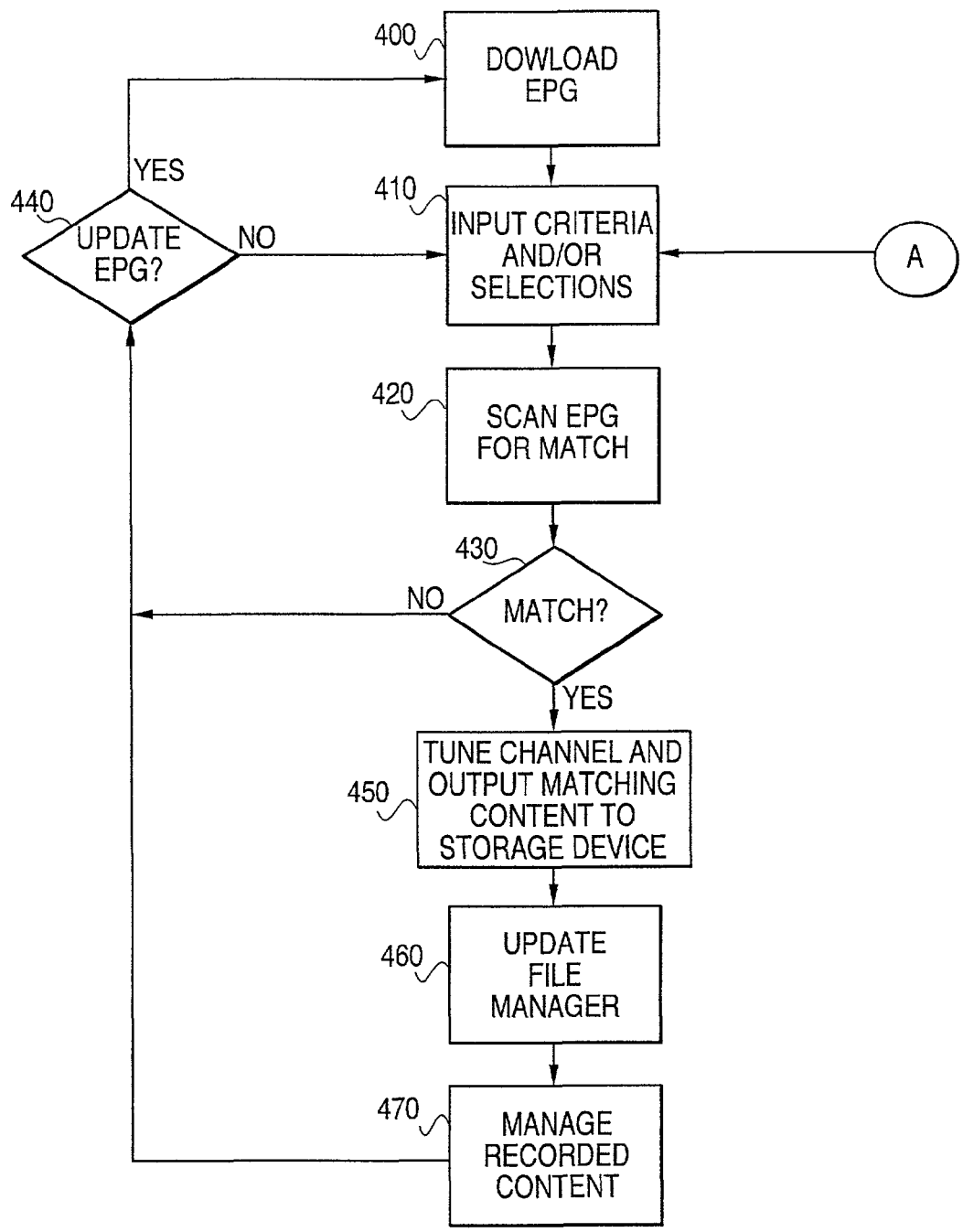
FIG. 4 is a high-level flow chart of a method of creating a video-on-demand service.

FIG. 4 illustrates further details of how the personalized video-on-demand system of FIG. 1 operates. This process begins in step 400 by downloading the electronic program guide 80. This may be done by utilizing port 82. For example, port 82 may be connected to a telephone line, cable connection, satellite up-link, or radio broadcast antenna. Using any or all of these methods, the information in the electronic program guide 80 may be down-loaded by step 400.

Step 410 then inputs criteria and/or selection(s). This process is described above in relation to FIG. 3 as indicated by connector A. In other words, the FIG. 3 process ends with connector point A which connects this process to the process of FIG. 4.

With the criteria and/or content selection in hand, step 420 can then scan the electronic program guide 80 for matches. In other words, the available content within the electronic program guide 80 is scanned for content matching the user's selections and/or criteria.

Step 430 then determines whether there is a match between the consumer selections and/or criteria and the electronic program guide 80. If there is no match, then the process may continue by proceeding to step 440 which decides whether to update the electronic program guide 80. Preferably, the electronic program guide 80 is updated on a periodic basis. For example, it may be most convenient to update the electronic program guide during off-peak hours. By tracking the user's viewing habits, the system can determine when these off-peak hours occur so that the downloading of the electronic program guide can occur when the consumer is not watching TV. If the electronic program guide 80 is to be updated, then the process proceeds to step 400 which downloads the electronic program guide 80. If not, then the process returns to the input step 410 which inputs the consumer's selections and/or criteria.

If there is a match between the consumer's selections and/or criteria, then the flow proceeds to step 450 which tunes the channel and/or otherwise outputs the matching content to the storage device. For example, the control unit 70 controls the receiver/tuner 40 to tune the channel of the available content spectrum to the appropriate channel. Then, the switch 50 is controlled by control unit 70 to switch the tuned channel to be fed to the storage device 200. The storage device 200 may then record the routed content.

Once the content has been recorded by storage device 200, step 460 then updates a file manager that may be part of the storage device 250, the control unit 70, other elements of the apparatus 100, or a separate entity. Essentially, the recorded content is stored as a file or files within the storage device 200. These file(s) have an associated address or header information that is managed by the file manager. Step 460 updates the file manager with information related to the recorded content.

By using the file manager, the user can then manage the recorded content with step 470. Specifically, the managing of the recorded content includes sorting, cataloging, adding comments, deleting, reorganizing, etc. Such management may also include on-demand playback. Such playback includes various commands including play, rewind, fast forward, pause, slow, skip, etc. in a manner similar to a video cassette recorder. It is noted that a VCR is given only by way of example, and any other device capable of the functions described above or similar functions, is also within the scope of the present invention.

The file manager may manage the recorded content by maintaining a data base, containing an entry for each recorded item. The entry may describe the content recorded and identify the memory device (either removable or not) which contains the recorded content. The entry may include all or part of the information received from the electronic program guide. The information received from the electronic program guide may be automatically entered. The entry may also be supplemented by notes or images from the user. The entry may contain alphanumeric characters, images, or both. The file manager may also forward the entry information to the printer 300, either directly from the storage device 200 or via the apparatus 100 (for example, the control unit 70) so that the entry information is printed on a label that can be affixed to the memory device. The file manager may also prompt the user, via user interface 90, to place a self-stick adhesive label in the printer 300.

The user may interface with the file manager via a graphical user interface (GUI), as is known in the art. The GUI allows the user to see what content is available. The GUI also indicates to the user where the content is stored, so the user can manually load the proper medium. As discussed above, alternatively the storage device 200 could automatically load the proper media by using a jukebox arrangement, for example.

As is apparent from the above, the database may be populated with information stored in the memory internal to the apparatus 100 or the storage device 200, as well as pre-recorded, removable media, for example, conventional DVDs. It is also possible that user-recorded content, which is stored in the memory internal to the apparatus 100 or the storage device 200, could be saved on removable media. In the instance, it may be advantageous to compress or modify compression parameters to improve the storage efficiency on the removable media. Generally, the apparatus 100 permits the copying or moving of content from internal, non-removable memory to external, removable memory, and vice versa.

The apparatus 100 also supports transcoding from one medium type to another to ensure efficient storage on the target medium. One such example is an initial, user-initiated request to record. The content may be recorded in internal, non-removable memory using one compression technique or set of compression parameters and recorded to an external, removable memory using a different compression technique or set of compression parameters, to thereby improve the storage efficiency of each memory type. In the context of the present specification, the term transcoding or coding is used to identify any type of compression, encryption, reformatting or other manipulation of the information to customize the information for the particular medium on which it is to be stored. After managing the recorded content in step 470, the flow then proceeds to step 440 which decides whether to update the electronic program guide 80 as described in detail above.

Figure 5:
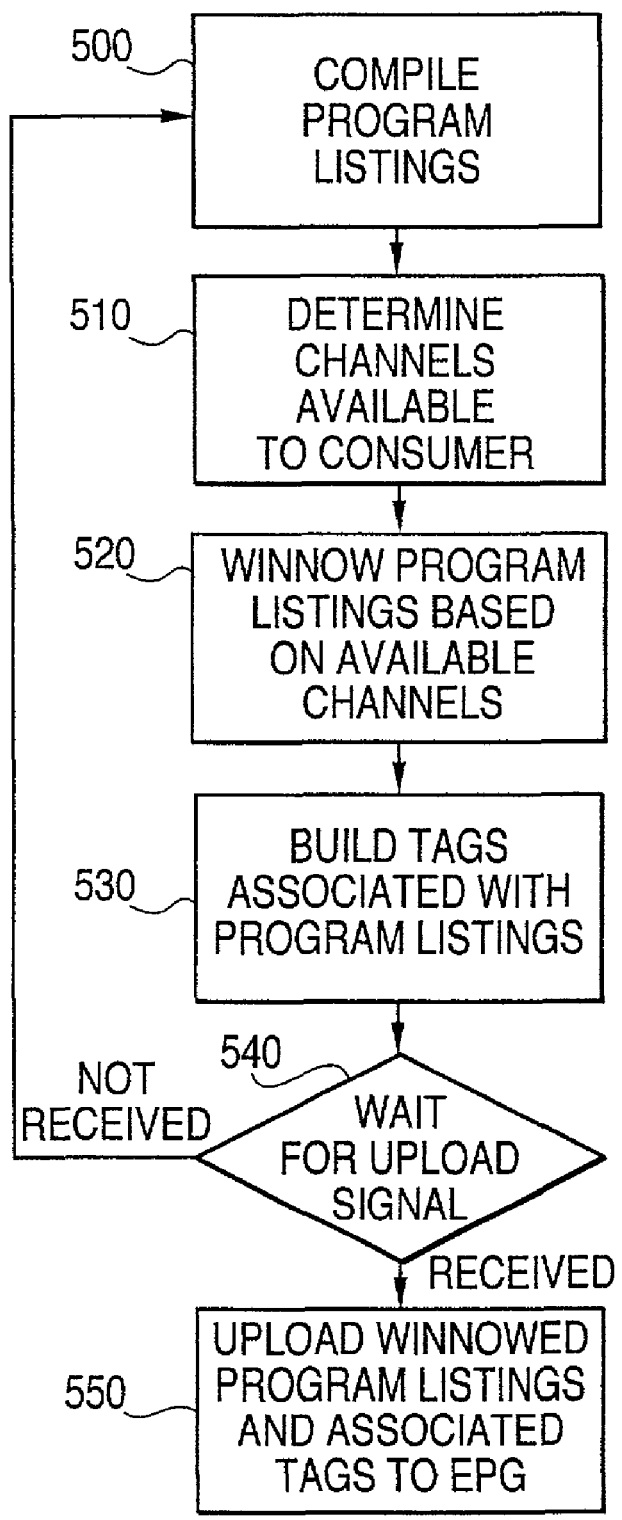
FIG. 5 is a high-level flow chart of a method of generating an electronic program guide according to the invention.

As shown in FIG. 5, the inventive methods also include building the electronic program guide. This process may start with step 500 which compiles the program listings. Such program listings include a channel line-up, names of programs, station information, descriptions of programs, and other information.

Next, step 510 determines which channels are available to the particular consumer. As there are a variety of broadcast systems throughout the world, the channel line-up is different for different consumers. Furthermore, consumers have a choice of broadcast system(s) from which to choose which affects the channels available to the consumer. Step 510 selects from the full spectrum of program listings those channels that are available to the consumer.

Step 520 then winnows the program listings based on the available channels. In other words, the data from step 510 is utilized to winnow the program listings to those that are available to the particular consumer.

Step 530 then builds tags that are associated with the program listings. The tags are described above and will not be repeated here. Step 530 gathers information to build the tags and associates the tags with the program listings.

Then, the system waits for an upload signal. If it has not been received, then the process leaps back to step 500. For example, more information may be available to build or supplement the tags. Also, more channels or less channels may be available to the consumer. All of these considerations are accounted for by looping through steps 500 through 540 until the upload signal has been received.

When the upload signal has been received, then the uploading process begins. Step 550 uploads the winnowed program listings and associated tags to the electronic program guide.

Although FIG. 5 is primarily directed to processes performed by the content feed 10, much of this process could alternatively performed on the consumer side by the apparatus 100. More specifically, the determination of the channels available to the consumer (step 510) and the winnowing of program listings based on available channels (step 520) may be performed on the consumer side by apparatus 100, in one example, by the control unit 70 working in conjunction with the electronic program guide 80 and the storage device 200. In this alternative, the content feed 10 would supply all program listings to the apparatus 100 for determination by the apparatus 100 of the available channels and winnowing of the program listings based on available channels.

As a further alternative, the tag building step 530 may also be performed by the apparatus 100. For example, the control unit 70 may utilize the various communication channels 26, 28, 30, 32 and/or 34 to gather information appropriate for the tags. These tags may then be associated with the corresponding program and stored in the electronic program guide.

The upload signal may be sent by the control unit to the content feed at a specific time, random time, or on command of the user via user interface 90. As mentioned above, it would be most convenient to update the electronic program guide during off-peak hours. By tracking the user's viewing habits, the system can determine when these off-peak hours occur so that the downloading of the electronic program guide can occur when the consumer is not watching TV.

Figure 2:
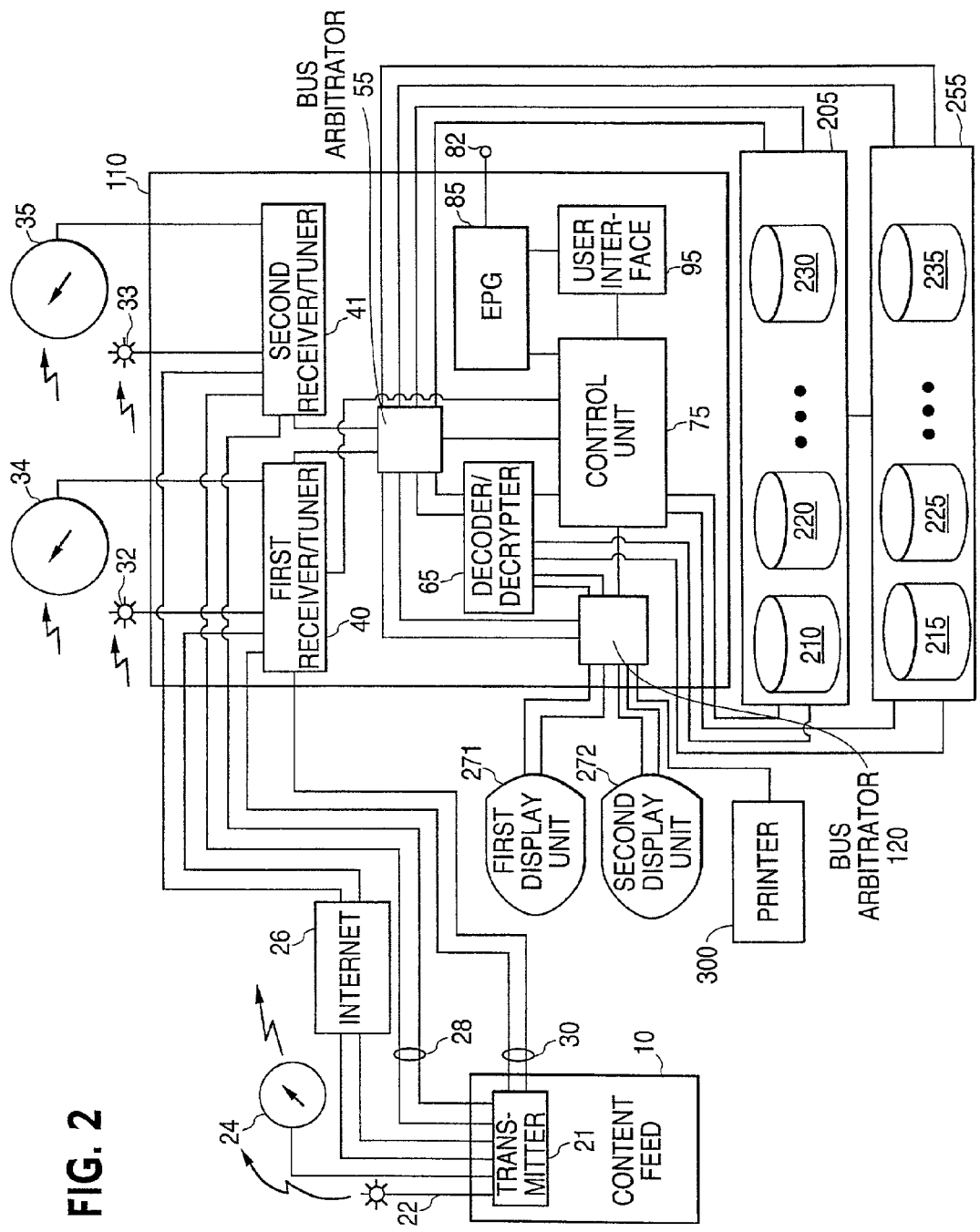
FIG. 2 is a block diagram of a personalized video-on-demand system according to a second aspect of the invention.

FIG. 2 illustrates an alternative embodiment of the personalized video-on-demand system. This alternative of FIG. 2 is specifically designed for reception/tuning of plural programs, simultaneous recording of two or more programs, as well as simultaneously recording one program while viewing or playing back another program.

Many elements from the first embodiment of FIG. 1 are also utilized in FIG. 2. Common or like reference numerals indicate similar devices and functionality. The FIG. 2 embodiment supports all features described above in conjunction with the FIG. 1 embodiment. Additional features are emphasized below.

The transmitter 21 of content feed 10 is capable of transmitting a plurality of content streams. As further shown in FIG. 2, there are at least two connections each provided to the internet 26, cable 28 and telephone lines 30. Furthermore, the transmitter 22 is capable of broadcasting two or more content streams. Likewise, the satellite up-link 24 is also capable of transmitting two or more content streams.

On the receiving end, the apparatus 110 includes inputs from a first satellite down-link 34 as well as a second satellite down-link 35. These satellite down-links may be integrated into a single satellite down-link having two feeds. In addition, two antennas 32, 33 are utilized. Alternatively, a single connection (satellite down-link, cable, telephone, or internet or antenna) having a split feed could also be utilized instead of the two connections described above. In other words, the connections may be configured to transmit/receive more than one content stream.

As further shown in FIG. 2, the apparatus 110 includes two receivers, specifically receiver/tuner 40 and receiver/tuner 41 which are connected the various communication devices as shown.

The output from receiver/tuners 40, 41 are provided to bus arbitrator 55. Bus arbitrator 55 outputs to bus arbitrator 120 as well as decoder/decrypter 65, storage device 205 and storage device 255. In this way, either or both of the inputs from receivers 40, 41 can be routed to bus arbitrator 120, decoder/decrypter 65, and/or storage devices 205, 255.

The decoder/decrypter 65 receives inputs from bus arbitrator 55 as well as storage devices 205, 255. The outputs of the decoder/decrypter are provided to the bus arbitrator 120.

Bus arbitrator 120 receives inputs from bus arbitrator 55 and decoder/decrypter 65. The output of bus arbitrator 120 is provided to first display unit 271 and second display unit 272.

The decoder/decrypter 65 is similar to the decoder/decrypter 60 of the FIG. 1 embodiment, with the main difference being that decoder/decrypter 65 is capable of handling a plurality of content streams. In other words, the decoder/decrypter 65 may simultaneously decode and/or decrypt more than one content stream.

The electronic program guide 85 is connected to the control unit 75, the user interface 95 and an input port 82. The electronic program guide (EPG) 85 is similar to the electronic program guide (EPG) 80 of the first embodiment except that the EPG 85 may handle a plurality of content streams. For example, the EPG 85 may be a combination of two EPGs 80.

Similarly, the user interface 95 permits the user to enter commands for both of the content streams rather than the single content stream handled by the first embodiment of FIG. 1.

The control unit 75 has control outputs to the receiver/tuners 40, 41; the bus arbitrator 55; the decoder/decrypter 65; the EPG 85; the user interface 95; the bus arbitrator 120; and the storage devices 205, 255.

The storage device 205 is similar to storage device 200 of the first embodiment, but is preferably equipped with a plurality of read/write units. In other words, a storage device 205 is preferably capable of simultaneously recording and/or playing back at least two programs.

An optional, second storage device 255 may also be provided as further shown in FIG. 2. This optional second storage device is connected to the first storage device 205 as well as to bus arbitrator 55 and decoder/decrypter 65.

The storage devices 205, 255 are preferably modular units that can be expanded by adding additional units therein. For example, if hard disk drives are used for the storage devices 205, 255 then the storage capacity can be expanded by adding additional hard disk drive units. Also, the same variety of storage media may be utilized for the storage devices 205, 255 as described in relation to the storage device 200, 250 of the first embodiment.

Figure 6:
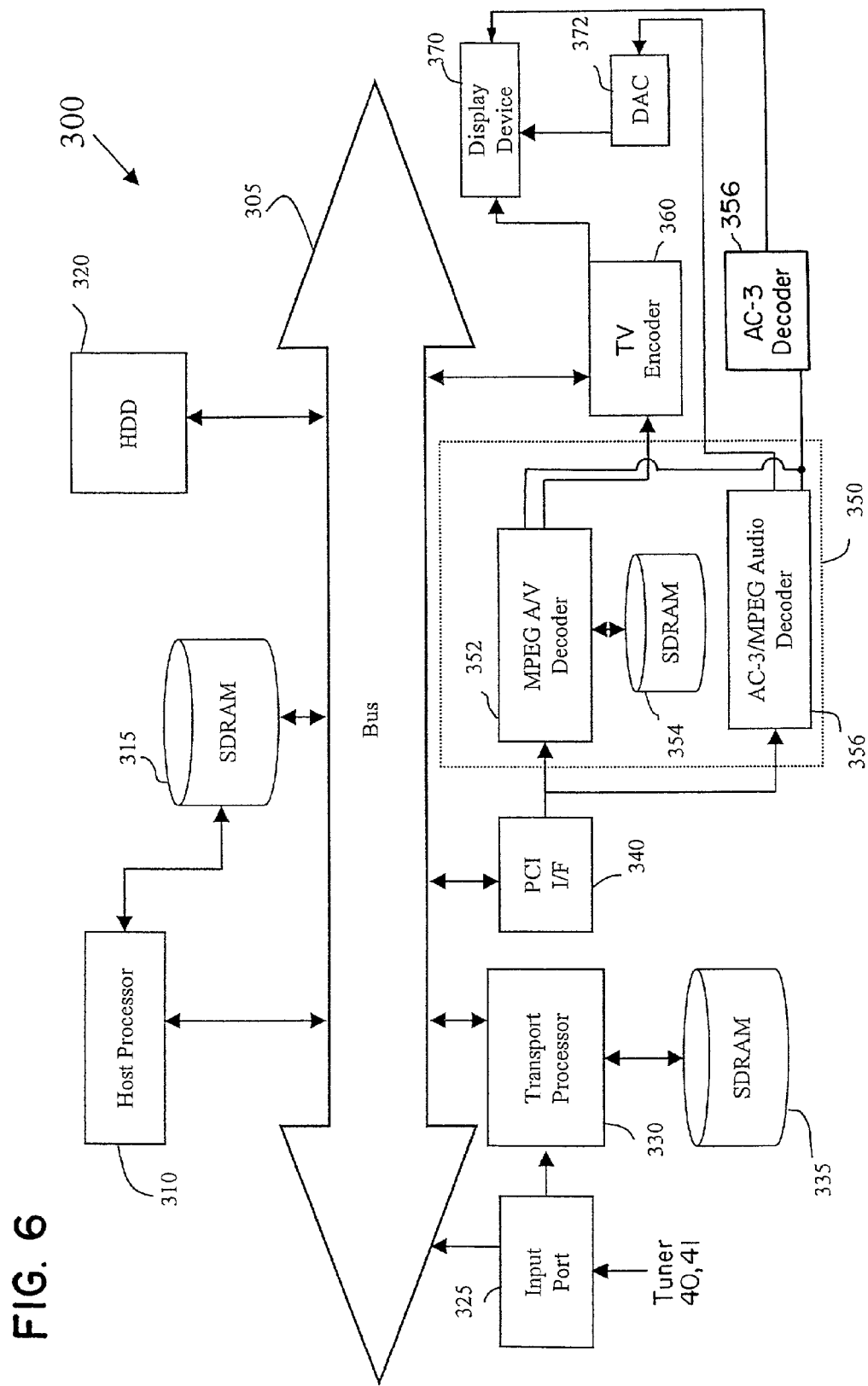
FIG. 6 is a block diagram of an exemplary architecture in accordance with the present invention.

FIG. 6 illustrates an exemplary architecture 700 of the apparatus 100 in accordance with another exemplary embodiment of the present invention. The architecture 700 utilizes a bus 305 to interconnect various components and to provide a pathway for data and control signals. FIG. 6 illustrates a host processor 310, a memory device 315 (in an exemplary configuration embodied as an SDRAM 315) and a hard disc drive (HDD) 320 connected to the bus 305. The host processor 310 may also have a direct connection to SDRAM 315 as shown in FIG. 6.

As further shown in FIG. 6, a transport processor 330 and PCI I/F 340 (peripheral component interconnect interface) are connected to the bus 305. The transport processor 330 also has a connection to input port 325 and SDRAM 335. Furthermore, the PCI I/F 340 is connected to a decoder 350. The decoder 350 is connected to a TV encoder 360. The output of TV encoder 360 is in turn sent to a display device 370. Decoder 350 may include both an MPEG A/V decoder 352 and an AC-3/MPEG audio decoder 356, the output of the latter being sent to display device 370 after conversion in a digital-to-analog converter (DAC) 372.

The host processor 310 may be constructed with conventional microprocessors such as the currently available Pentium™ processors from Intel. Host processor 310 performs non real-time functions in the architecture 700, such as graphics-user interface and browser functions.

HDD 320 is actually a specific example of a mass storage device. In other words, the HDD 320 may be replaced with other mass storage devices as is generally known in the art, such as known magnetic and/or optical storage devices, (i.e., embodied as RAM, a recordable CD, a flash card, memory stick, etc.). In an exemplary configuration, HDD 320 may have a capacity of at least about 25 Gbytes, where preferably about at least 20 Gbytes is available for various recording applications, and the remainder flexibly allocated for pause applications in architecture 700.

The bus 305 may be implemented with conventional bus architectures such as a peripheral component interconnect (PCI) bus that is standard in many computer architectures. Alternative bus architectures could, of course, be utilized to implement bus 305.

The transport processor 330 performs real-time functions and operations such as control of the A/V data flow, conditional access, program guide control, etc., and may be constructed with an ASIC (application specific integrated circuit) that contains, for example, a general purpose R3000A MIPS RISC core, with sufficient on-chip instruction cache and data cache memory. Furthermore, the transport processor 330 may integrate system peripherals such as interrupt, timer, and memory controllers on-chip, including ROM, SDRAM, DMA controllers; a packet processor, crypto-logic, PCI compliant PC port, and parallel inputs and outputs. The implementation shown in FIG. 6 actually shows the SDRAM 335 as being separate from the transport processor 330, it being understood that the SDRAM 335 may be dispensed with altogether or consolidated with SDRAM 315. In other words, the SDRAMs 315 and 335 need not be separate devices and can be consolidated into a single SDRAM or other memory device.

The input port 325 receives audiovisual bitstreams from at least two tuners 40 that may include, for example, MPEG-1 and MPEG-2 video bitstreams, MPEG-1 layer II audio bitstreams and Dolby digital (AC-3) audio bitstreams. Exemplary A/V bitrates may range from about 60 Kbps to 15 Mbps for MPEG video, from about 56-384 Kbps for MPEG audio, and between about 32-448 Kbps for AC-3 audio. The single-stream maximum bitrate for architecture 700 may correspond to the maximum bitrate of the input programming, for example 16 Mbps or 2 MBps, which corresponds to the maximum MPEG-2 video bitrate of 15 Mbps, maximum MPEG-1 Layer-2 audio bitrate of 384 kbps, and maximum AC-3 bitrate of 448 kbps.

Of course, various other audiovisual bitstream formats and encodation techniques may be utilized in recording. For example, architecture 700 may record an AC-3 bitstream, if AC-3 broadcast is present, along with MPEG-1 digital audio. Still further, the received audiovisual data may be encrypted and encoded or not encrypted and encoded. If the audiovisual data input via the input port 325 to the transport processor 330 is encrypted, then the transport processor 330 may perform decryption. Moreover, the decryption may be performed instead by the host processor 310.

Alternatively, the host processor 310 and transport processor 330 may be integrated or otherwise replaced with a single processor. As mentioned above, the SDRAMs (315 and 335) may be consolidated or replaced with a single SDRAM or single memory device.

The PCI I/F 340 may be constructed with an ASIC that controls data reads from memory. Audiovisual (A/V) data may be sent to the host processor 310's memory while simultaneously being sent to an MPEG A/V decoder 352, as further discussed below.

As previously noted, decoder 350 may be constructed as shown in FIG. 6 by including the MPEG A/V decoder 352 connected to the PCI I/F 340, as well as an AC-3/MPEG audio decoder 356 which is also connected to the PCI I/F 340. In this way, the video and audio bitstreams from the PCI I/F 340 can be separately decoded by decoders 352 and 356, respectively. Alternatively, a consolidated decoder may be utilized that decodes both video and audio bitstreams together. As mentioned above, the encodation techniques are not limited to MPEG and AC-3 and can include any known or future developed encodation technique. In a corresponding manner, the decoder 350 could be constructed to process the selected encodation technique(s) utilized by the particular implementation desired.

In order to more efficiently decode the MPEG bitstream, the MPEG A/V decoder 352 may also include a memory device such as SDRAM 354 connected thereto. This SDRAM 354 may be eliminated, consolidated with decoder 352 or consolidated with the other SDRAMs 315 and/or 335.

TV encoder 360 is preferably an NTSC encoder that encodes, or converts the digital video output from decoder 350 into a coded analog signal for display. Regarding the specifications of the NTSC (National Television Standards Committee) encoder 360, the NTSC is responsible for setting television and video standards in the United States. The NTSC standard for television defines a composite video signal with a refresh rate of 60 half-frames (interlaced) per second. Each frame contains 525 lines and can contain 16 million different colors.

In Europe and the rest of the world, the dominant television standards are PAL (Phase Alternating Line) and SECAM (Sequential Color with Memory). Whereas NTSC delivers 525 lines of resolution at 60 half-frames per second, PAL delivers 625 lines at 50 half-frames per second. Many video adapters or encoders that enable computer monitors to be used as television screens support both NTSC and PAL signals. SECAM uses the same bandwidth as PAL but transmits the color information sequentially. SECAM runs on 625 lines/frame.

Thus, although use of NTSC encoder 360 is envisioned to encode the processed video for display on display device 370, the present invention is not limited to this standard encoder. PAL and SECAM encoders may also be utilized. Further, hi-definition television (HDTV) encoders may also be viable to encode the processed video for display on a HDTV, for example.

Display device 370 may be an analog or digital output device capable of handling a digital, decoded output from the TV encoder 360. If analog output device(s) are desired, to listen to the output of the AC-3/MPEG audio decoder 356, a digital-to-analog converter (DAC) 372 is connected to the decoder 350. The output from DAC 372 is an analog sound output to display device 370, which may be a conventional television, computer monitor screen, portable display device or other display devices which are known and used in the art. If the AC-3/MPEG digital audio data are to be decoded by an external audio component, a digital audio output interface (not shown) may be included between the AC-3/MPEG audio decoder 356 and display device 370. The interface may be a standard interface known in the art such as a SPDIF audio output interface.

Figure 7:
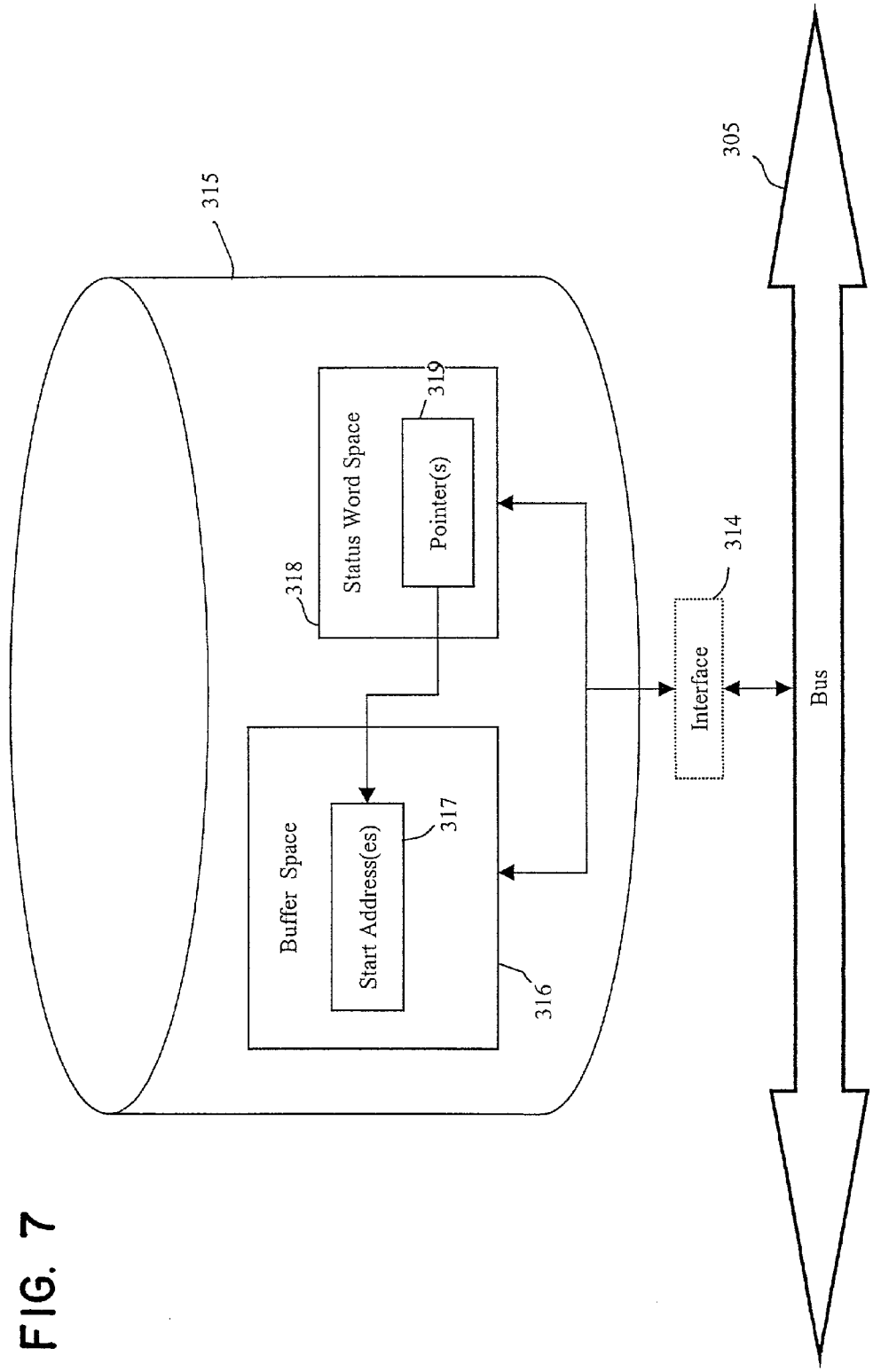
FIG. 7 is a block diagram showing an exemplary construction of a memory device according to an exemplary embodiment of the present invention.

FIG. 7 illustrates various components that may be provided for the SDRAM 315. As mentioned above, the SDRAM shown in FIG. 6 is actually a specific implementation of a memory device. It is noted that the invention is not limited to this specific implementation of SDRAM 315 and can include any other known or future developed memory technology. Regardless of the technology selected, the memory device 315 may include a buffer space 316 which may be a fixed or virtual set of memory locations that buffers or otherwise temporarily stores audiovisual data. In practice, the video data may be stored separate from the audio data, but it would be possible to intermix these data types depending upon the particular application and coding techniques utilized for the audio and visual data.

The audio visual data stored in the buffer space 316 includes one or more start addresses 317 which indicate the beginning memory address at which the audio and/or video data (A/V) is stored. If the A/V data is separately stored, then a plurality of stored addresses will be necessary. Furthermore, if there are more than one set of, or a block of data within the buffer space 316, then the start addresses 317 will individually point to each block of data.

The memory device 315 also includes a status word space 318. This status word space includes fixed or virtual addresses at which status words may be stored. An example of a status word that may be stored in the status word space 318 is a status word summarizing the status of a peripheral device. For example, the status word that may be stored within the status word space 318 may include the status of the host processor 310 or transport processor 330. The status word space 318 may also include pointers 319 that point to the start addresses 317 within the buffer space 316.

As further shown in FIG. 7, the SDRAM 315 may connect to the bus 305 via an interface 314. The dash lines indicate that the interface 314 is optional and may or may not be included depending upon the interface requirements of the particular memory device 315 and/or bus 305.

Figure 8:
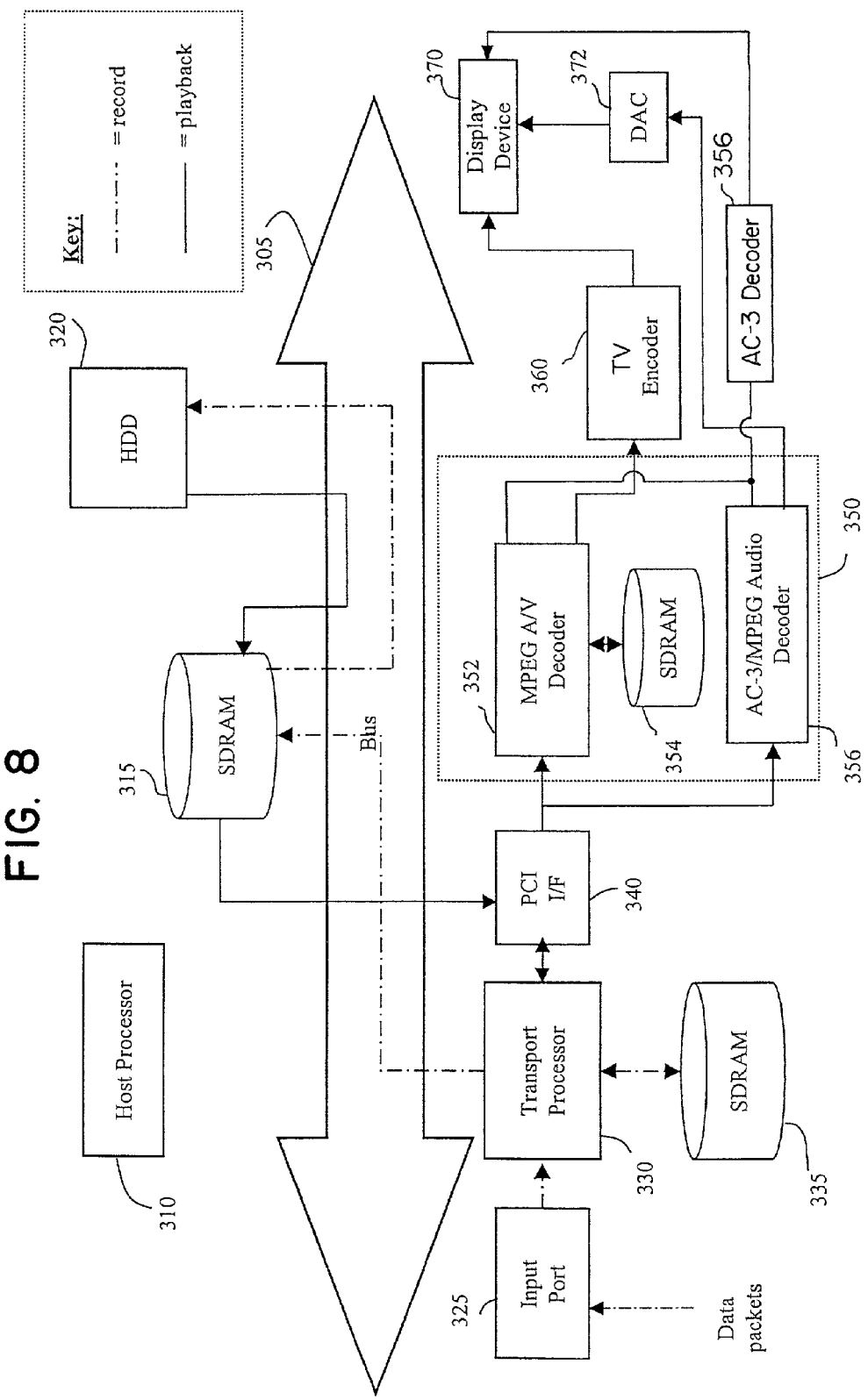
FIG. 8 is a flow diagram showing data flow for recording or caching programs such as pay-per-view (PPV) events for later playback in accordance with an exemplary embodiment of the present invention.

Exemplary recording and playback paths are described in accordance with FIGS. 8 and 9. FIG. 8 shows the recording and playback data flows among the various components of the architecture 700. Some of the connections between components, and associated reference numerals from FIG. 6 may have been eliminated in FIG. 8 in order to highlight the data flow which is shown using dashed lines (see Key) in FIG. 8.

As shown in FIG. 8, A/V data of a selected or desired event, program and/or broadcast from at least two tuners 40 is received by input port 325 (typically the data is received in packetized form) and fed to the transport processor 330. The transport processor 330 then transfers the received A/V data to SDRAM 315. Digital recording is accomplished by the host processor 310, which transfers the A/V data buffered by SDRAM 315 to the HDD 320. In other words, the SDRAM 315 serves as a buffer which buffers data sent by transport processor 330. This allows the host processor 310 to control the recording onto the HDD 320 when host processor 310 time is available. When a sufficient amount of programming data has been accumulated in the SDRAM 315, the host processor 310 transfers the data from the SDRAM 315 to the HDD 320 for recording therein.

FIG. 9 illustrates an alternative signal path for recording. Audiovisual data is fed from the input port 325 to the transport processor 330. The transport processor 330 then transfers the received audiovisual data to the PCI I/F 340, as indicated by the dashed data flow line. The PCI I/F 340 receives audiovisual data from the transport processor 330 via bus 305, and sends this data to host processor 310, more particularly to SDRAM 315.

Digital recording is accomplished similarly, with SDRAM 315 serving as a buffer that buffers data sent by the PCI I/F 340. This allows the host processor 310 to control the recording onto the HDD 320 when processor time is available. When a sufficient amount of A/V data has been accumulated in the SDRAM 315, the host processor 310 transfers the data from the SDRAM 315 to the HDD 320 for recording therein. To record data, the host processor 310 may also inform the PCI I/F 340 of available start addresses in the SDRAM buffer space 315 to which data may be buffered for eventual recording in HDD 320.

The operation of playing back the recorded A/V data that represents a stored event, program, broadcast, etc. in architecture 700 is now described. Referring again to FIGS. 8 and 9, when the viewer turns the apparatus 100 on, the viewer is given the option to playback any of the previously recorded programs, events, broadcast, etc. . Preferably, this may be done by using remote control (not shown) to access a menu on display device 370. If the viewer selects a desired event, the corresponding A/V data (which typically may also include system time and conditional access packets) are retrieved from HDD 320.

In particular, when the user selects the playback option, the selected A/V data recorded on HDD 320 is sent via bus 305 to a queue in SDRAM 315. Next, the buffered data is sent from SDRAM 315 via bus 305 to PCI I/F 340, which in turn sends the selected A/V data to decoder 350. More specifically, the video portion of the bitstream is sent to MPEG A/V decoder 352, with the audio portion being sent to AC-3/MPEG audio decoder 356. Alternatively, MPEG video and audio can be conveyed to MPEG A/V decoder 352.

Within decoder 350, MPEG A/V decoder 352 may be provided with an SDRAM 354 in order to more efficiently decode the MPEG bitstream received from PCI I/F 340.

SDRAM 354 is similar to SDRAM 315 discussed above in its construction. SDRAM 354 temporarily holds the encoded video bitstream data, and also provides the three frame buffers required for MPEG decoding, as is known in the art. Thereafter, the decoded A/V data is output to TV encoder 360 for conversion to an analog format, so that it may be displayed on display device 370. From this point on, the playback data looks, for all intents and purposes, identical to the originally recorded event, program, broadcast, etc.

FIG. 2 illustrates another exemplary embodiment. The embodiment of FIG. 2 generally operates as follows. For further details on an exemplary method of operation, further reference is made to FIG. 10 which is explained below in detail.

As mentioned above, a plurality of content streams may be fed to apparatus 110 of the second embodiment. For example, two simultaneous content streams can be provided to the receiver/tuners 40, 41. The bus arbitrator 55 can switch either or both of these content streams and provide the output to various devices.

If recording is desired, then the control unit 75 directs the bus arbitrator 55 to switch the content from receiver/tuners 40, 41 to the storage device 205. In this way, two programs from two separate content streams can be simultaneously recorded by the storage device 205. Alternatively, one of the programs can be fed to storage device 205 while the other is fed to storage device 255.

Some of the features performed by the various exemplary embodiments of the present invention are described below.

As described above in conjunction with FIG. 3, a user may select a single or multiple recorded events from a program guide or scheduler, such EPG 85, for viewing based on actors, actresses, directors, program title, key words, key phrases, synopsis, release date, critical review, related programs, sequels, a thumbnail, a preview, a snippet, or other information concerning or relating to the content. In one embodiment, the user activates this "intelligent agent" feature via an input device such as a remote control. For example, the user may display the EPG 85 on the screen of a display unit, such as first display 271 or second display unit 272 and activate one or more menu screens for entering key word information such as the tag information described above or phrases that the user has pre-assigned to programs.

Alternatively, the user may initiate a browse function to search a listing of programs stored on HDD 320, which may be organized alphabetically, by category of program (i.e., drama, comedy, action adventure, etc.) and/or by organizational structure created by the user. For example, a user may assign "record channel" numbers to various recorded programs, whereby the user may click up or down a channel listing menu screen to select a desired channel. Once selected, the screen may display a listing of recorded programming assigned to that channel, grouped by key word such as title, for example.

Another feature of the control unit 75 is the implementation of a duplicate episode filter. This feature of control unit 75 tracks the list of recorded programs for duplicates when a record operation is initiated. When a user selects a record operation, the control unit 75 references the storage devices 205, 255, to check certain characteristics of the selected program to be recorded with the information stored in memory devices 210, 215, 220, 225 . . . 230, 235. If a match is determined, a notification may visually be displayed for the user.

In order to identify a match, characteristics such as the tag information described above, or unique call numbers may be compared. In one exemplary embodiment, the first display unit 271 or second display unit 272 may display the characteristics of the selected program to record with the best match in memory in a side-side fashion, for ease of comparison by the user. Alternatively, the user may be prompted with the notification and the option to view the possible match so as to confirm that the user is about to record a duplicate of a recorded program.

Additionally, the user may be provided with a halt recording option if the duplicate episode filter feature has identified a match, where the control unit 75 sends a prompt or notification after the match, asking the user if they would like any or all portions of the duplicate episode to be erased. Alternatively, the user may activate an automatic preference to have the control unit 75 erase any recording of a program that is identified as a duplicate episode by the duplicate episode filter feature.

An active snapshot is another operational mode of the present invention which dumps the A/V stream from the TV encoder 360 to another device such as a PC or other output device. In this way, the active snapshot can offload A/V segments (or entire programs or even the entire contents of the HDD 320) to another device. This active snapshot may be accomplished by feeding the decoded stream from the decoders 352, 356 (MPEG A/V decoder and/or AC-3/MPEG Audio decoder) to the display device 370 as shown in FIG. 6, for example. The output device 370 may be a PC, another HDD, CDR (recordable CD), or other digital device capable of storing the data.

Alternatively, the active snapshot may dump encoded or decoded data to an external device by having the host processor 310 route data from the HDD 320 to the PCI bus and eventually to the external device.

As a further alternative, the active snapshot can dump analog data to the analog output device by feeding the decoded stream from the decoders 352, 356 (MPEG A/V decoder and/or AC-3/MPEG Audio decoder) to the DAC 372 and TV encoder 360 which converts the digital, decoded stream to an analog signal. The analog signal is then supplied to an analog display device 370 as shown in FIG. 6. The analog output device 370 may be a conventional VCR or other analog mass storage device.

If simultaneous record and playback is desired, then control unit 75 directs one of the content streams from receiver/tuner 40, 41 to the storage device 205 by sending a control signal to bus arbitrator 55. At the same time, the control unit 75 can control the storage device 205 or 255 to playback another program previously recorded therein which is fed from the storage device 205 or 255 to decoder/decrypter 65 and then to bus arbitrator 120. Further control can then be exercised by control unit 75 which can control bus arbitrator 120 to feed the playback or record program to either or both display units 271, 272.

The display units 271, 272 may be separate display devices or may be integrated in a single display device. For example, conventional picture-in-picture display devices can handle two simultaneous input streams and such a device is within the scope of this invention.

The exemplary embodiments of the present invention may also be provided with a status indicator function which can be displayed via a user interface to the apparatus 100, such as with a remote control unit for example. The following features may be provided: current delay, status indicator, available record time, HDD 320 capacity (Disk Gas Gauge), out-of-disk space alert and certain file attributes. These features are summarized in Table 1 below.

TABLE 1

Special Features

| Feature | Description |
| --- | --- |
| Automatic record | Theme recording base on program title, keywords or key phrases |
| Duplicate show handling | Will not record two copies of the same show |
| On-screen time display | Display the current time into the show, ie. 0:34, 1:12 etc while in Playback, Fast-forward or Rewind |
| Back to pause | After resume live broadcast, jump back to last pause point |
| Active Snapshot | Dump audio/video to PC or other output device |
| Smart delete | Once a show is recorded, it can be set it to never be deleted |

The current delay feature allows the user to see how far the recording is behind a live feed when pausing the live signal. The status indicator may be displayed on the display device 370, and indicates whether the material a viewer is watching is LIVE (a live feed) or RECORDED. In one embodiment, the status indicator may flash LIVE or RECORDED on the output device 370. The available record time feature indicates the amount of time available for recording (in minutes, for example).

If simultaneous playback of two programs is desired, then control unit 75 controls the storage devices 205 and/or 255 to simultaneously playback two previously recorded programs. These programs are fed through decoder/decrypter 65 into bus arbitrator 120. Preferably, control unit 75 would then control arbitrator 120 to switch one of the programs to the first display unit number 271 while the other is directed to the second display unit 272.

If the user wants to view a live broadcast while recording another program, then the control unit 75 operates as follows. In this example, it is assumed that the live program to be viewed is being received by the first receiver/tuner 40. Control unit 75 then sends a control signal to bus arbitrator 55 to route the live broadcast program to either the bus arbitrator 120 or the decoder/decrypter 65. This decision is made depending on whether the live broadcast requires decoding and/or decryption. Depending upon which display unit is intended for viewing, the control unit 75 controls the bus arbitrator 120 to route the decoded and/or decrypted content to the appropriate display unit 271, 272. If no decryption or decoding is necessary, then control unit 75 directs the bus arbitrator 55 to route the content directly to bus arbitrator 120 which can then send the live broadcast to either of the display units 271, 272.

A clear/convert function is another feature of the present invention which permits a user to convert a paused program to a permanently recorded program. For example, when the apparatus 100 is turned on, an auto pause function may be enabled that automatically pauses (records) the currently-tuned channel. The user could then be given the option to convert this paused program to a permanently recorded program. Alternatively, a channel surfing user who pauses a program and who, at some point within the pause window, decides that the program is worth permanently recording could, for example, press an button on the remote control to command the apparatus 100 to permanently record the program.

As another alternative, as the duration of the pause approaches the pause time window, the user could be prompted with a query such as "permanently record?" If yes, then the program is converted from a paused program to a permanently recorded program. In this way, the user will not lose any of the program that may have otherwise extended beyond the pause time window.

As yet another alternative, a channel change from channel #1 to channel #2 converts paused channel #1 to recorded channel #1, begins pause of channel #2 and provides user with option to clear recorded channel #1.

To convert from a paused to a recorded program, the apparatus 100 may move the paused program from a portion of the HDD 320 reserved for pausing to a portion reserved for recorded programs. Alternatively, the HDD 320 directory may be updated to reallocate space such that the paused program now resides in a virtual recorded program HDD 320 space. Such moves or HDD directory updates may be performed by the host processor 310.

A personal instant replay is another feature of the present invention which permits a variable back tracking instant replay (up to the length of pause). The amount to back track may correspond to the duration the remote control button is depressed. The mechanism for instant replay may be identical to that of playback. Furthermore, an infinite loop may be established so that the instant replay is played again and again until stopped by command of the user. Alternatively, the playback may stop when a certain number of loops have been completed.

If the consumer wants to see two live broadcasts with no recording, then the control unit 75 controls bus arbitrator 55 to route both received content streams to either decoder/decrypter 65 or to bus arbitrator 120 depending upon whether decryption and/or decoding is necessary. Thereafter, the displays can be switched by bus arbitrator 120 under the control unit 75 to the appropriate displays 271, 272.

A back to pause function is another feature of the present invention which may also be triggered with the remote control. The back to pause function jumps back to the paused time location. More specifically, after resuming a live broadcast from a paused program, the back to pause function jumps back to last pause point. In other words, the A/V stream is played back from the last pause point.

As can be seen from the above description, the FIG. 2 embodiment is highly advantageous and permits a variety of functions. For example, a user can simultaneously record at least two content streams on the storage devices 205 or 255. In this way, the video-on-demand library can be quite rapidly accumulated.

Furthermore, the FIG. 2 embodiment permits the simultaneous viewing of one program while another is being recorded. In this way, a consumer can watch his television in the normal manner while still accumulating a video-on-demand library in the background. When the live television broadcast gets boring or is no longer interesting, then the user can switch to the video-on-demand library that has been accumulating during his viewing or at other times.

Furthermore, the electronic program guide 85 permits a user to navigate the plurality of desired content, make appropriate selections and build the video-on-demand library that most suits his needs.

FIG. 10 further illustrates some of the methods utilized by the second embodiment. Generally speaking, FIG. 10 resolves scheduling conflicts between two or more programs.

More specifically, the process of FIG. 10 begins by scanning the electronic program guide 85 for a match. This is similar to the process described in relation to step 430 in FIG. 4. One difference is that step 600 may scan for more than one match.

Step 610 determines if there is at least one match. If not, then the process loops back to step 600. If there is at least one match, then the flow proceeds to step 620 which determines whether there is a scheduling conflict. More specifically, step 620 determines whether the recording of one program matching the consumer's desires would overlap with the recording of another program matching the consumer's desires.

If there is no conflict, then the flow proceeds to step 630 which records the matching content. Thereafter, the file manager is updated in a manner similar to step 460 in FIG. 4 and the flow proceeds to step 670 which is described below.

If there is a conflict, then step 650 performs multiple recording of the plurality of programs matching the consumer's desires. This process is generally described above and utilizes the control unit 75 to switch the desired content through bus arbitrator 55 to the storage devices 205 or 255. The switching is controlled on a scheduled basis according to the time schedule of each program. Multiple recording continues as long as there is an overlap between the schedules.

Step 660 determines whether all recording has finished. If so, then the file manager is updated in step 640 which process is described above.

If all recording has not been finished, then a further decision is made in step 670 to determine whether there is one or more recording to be completed. If so, then the process loops back to step 600 which again scans the electronic program guide 85 for another match. In this way, the system can continue recording at least two programs simultaneously.

Although the above description relates to recording two programs simultaneously, the embodiment of FIG. 2 can be extended to record three or more programs simultaneously. Essentially, the components of FIG. 2 would be multiplied such that there would be N receivers/tuners and the storage devices would be capable of recording N programs simultaneously.

As described above, the various exemplary embodiments of the present invention include several modes, including, but not limited to recording two or more signals where one or both may also be simultaneously viewed, recording one or more signals and playing back one or more signals, playing back two or more signals, watching one or more signals, while recording one or more other signals, viewing two or more live signals (through the use of picture-in-picture or other similar function), and viewing at least one signal live, while viewing one or more signals in playback mode. It is noted that the various functions described above may be utilized in conjunction with one or more of these modes. For example, the intelligent agent duplicate filter, and active snapshot functions may be used with any recording mode, the status indicator and personal instant replay features may be utilized with any playback mode, and the status indicator, clear convert, record after watching, and personal instant replay functions may be utilized in any live viewing mode. The back to pause function may be utilized to jump between any two or more live or playback signals.

Although most of the specification is directed to devices and methods for handling video content, the invention also applies to audio content, data content or mixed content. In other words, the content feed may supply audio or data content to the apparatus 100 or 110.

For example, the decoder/decrypter 60, 65 could be reconfigured to decode and/or decrypt audio data. In addition, the MP3 standard (currently MPEG-1 Layer III), the Windows Media Audio (WMA) standard or other conventional decoding schemes as well as conventional decrypting schemes may be utilized by decoder/decrypter 60, 65 to decode and/or decrypt the audio content. Furthermore, the display units 270, 271, 272 would be speakers or other audio reproduction devices instead of video display units in this alternative. Otherwise, the systems and methods of the invention would work in much the same manner to aggregate an audio-on-demand library.

In at least one embodiment described above, the present invention contemplates the concurrent use of internal, non-removable memory and external, removable memory. In at least one embodiment described above, the present invention also contemplates recording content in an internal, non-removable memory prior to recording in an external, removable memory, where the recording to the external, removable memory can occur in a background mode. In at least one embodiment described above, the present invention also contemplates recording content by streaming directly to the removable medium. In at least one embodiment described above, the present invention also contemplates playing back by recording from the external, removable memory into the internal, non-removable memory and then playing back from the internal, non-removable memory. As mentioned above, the invention may also be applied to aggregate desired data. If data is being aggregated by the present invention, then the system may be labeled a personal data server farm. For example, a personal data server farm according to the invention may aggregate a data-on-demand library such as a library of desired usenet news. The consumer could designate usenet newsgroups that interest that user using the user interface 90 and, perhaps an electronic program guide 80 and the system would then aggregate a library of usenet news. This aggregated library of data may then be manipulated on-demand of the user. Various other types of data may be aggregated by the invention with usenet news being only an illustrative example. If the invention is being applied to aggregate data content, then the decoding and/or decrypting schemes may utilize schemes appropriate to decoding and/or decrypting data. Furthermore, if the data is being broadcast according to a schedule then the scheduling and scheduling conflict resolution features described above in terms of audio data may be applied to such broadcast data.

Furthermore, the inventive apparatus 100,110 may be embodied in a variety of ways. A set-top box is one example. Other examples include a personal computer (PC), TV or hardware card that is added to an existing apparatus such as a conventional set-top box, PC or TV. Still further, the inventive functionality may be downloaded or otherwise programmed into a set-top box, PC or TV. Such programming may be accompanied by connecting the programmed device to a storage device such as hard disc drive array 200. Furthermore, although FIGS. 1 and 2 illustrate electronic program guides 80,85 as part of the apparatus 100,110, the electronic program guide content could also be provided by the content feed 10.

It is noted that the functional blocks in FIGS. 1-2 and 6-9 may be implemented in hardware and/or software. The hardware/software implementations may include a combination of processor(s) and article(s) of manufacture. The article(s) of manufacture may further include storage media and executable computer program(s). The executable computer program(s) may include the instructions to perform the described operations. The computer executable program(s) may also be provided as part of externally supplied propagated signal(s) either with or without carrier wave(s).

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. A method of processing available content including broadcast programming and recorded programming, comprising:
activating an automatic preference to erase any recording of a program identified as a duplicate;
tuning to a broadcast program using one or more tuners;
receiving a command to pause the tuned program;
temporarily storing the tuned program to a portion of storage dedicated for pausing upon receiving the pause command;
receiving a user command to record the paused program;
tracking a list of previously recorded programs for duplicates upon receiving the user command to record the paused program; and
selectively terminating and erasing the recording of a paused program when the paused program is identified as a duplicate based on the activated automatic preference, and completing the recording of the paused program when the paused program is identified as a non-duplicate by moving the paused program from the portion of storage dedicated for pausing to a portion of storage dedicated for recorded programs.

2. The method of claim 1, further comprising selecting from the available content based on actor, actress, director, program title, key word, key phrase, tag information, synopsis, release date, critical review, related program, or sequel.

3. The method of claim 1, wherein selecting from the available content is achieved by a user browsing through information related to the available content stored on at least one storage medium.

4. The method of claim 1, further comprising displaying a status along with a program a user is currently viewing.

5. The method of claim 4, wherein the status includes at least one of: a current delay, a status indicator, an available record time, a storage medium capacity, and an out-of-space alert.

6. The method of claim 5, wherein the current delay allows a user to see a delay between the program the user is currently viewing and a live feed of the program.

7. The method of claim 6, further comprising permitting a user to rewind the available content in an increment for playback of a portion of the available content.

8. The method of claim 1, further comprising creating a personalized database from the available content.

9. An apparatus for processing available content including broadcast programming and recorded programming, comprising:
one or more tuners for receiving a broadcast program;
a storage medium, and
a control unit, wherein the control unit is controllable to:
activate an automatic preference to erase any recording of a program identified as a duplicate;
receive a command to pause the tuned program;
temporarily store the tuned program to a portion of the storage medium dedicated for pausing upon receiving the pause command;
receive a user command to record the paused program;
track a list of previously recorded programs for duplicates upon receiving the user command to record the paused program;
selectively terminate and erase the recording of a paused program when the paused program is identified as a duplicate based on the activated automatic preference, and completing the recording of the paused program when the paused program is identified as a non-duplicate by moving the paused program from the portion of the storage medium dedicated for pausing to a portion of the storage medium dedicated for recorded programs.

10. The apparatus of claim 9, wherein the control unit selects from the available content based on actor, actress, director, program title, key word, key phrase, tag information, synopsis, release date, critical review, related program, or sequel.

11. The apparatus of claim 9, wherein the control unit selects from the available content by browsing through information related to the available content stored on at least one storage medium.

12. The apparatus of claim 9, wherein the control unit displays a status along with a program a user is currently viewing.

13. The apparatus of claim 12, wherein the status includes at least one of: a current delay, a status indicator, an available record time, a storage medium capacity, and an out-of-space alert.

14. The apparatus of claim 13, wherein the current delay allows the user to see a delay between the record operation and a live feed of the program.

15. The apparatus of claim 9, wherein the control unit further rewinds the available content in an increment for playback of a portion of the available content.

* * * * *